US006776306B1

(12) United States Patent
Michael et al.

(10) Patent No.: US 6,776,306 B1
(45) Date of Patent: Aug. 17, 2004

(54) APPARATUS FOR DISPENSING MEDICAL ITEMS

(75) Inventors: James A. Michael, Cranberry Township, PA (US); David T. Frederick, North Huntington, PA (US); H. Thomas Graef, Bolivar, OH (US)

(73) Assignee: MedSelect Inc., Cranberry Township, PA (US)

( * ) Notice: Subject to any disclaimer, the term of this patent is extended or adjusted under 35 U.S.C. 154(b) by 0 days.

(21) Appl. No.: 09/921,014

(22) Filed: Aug. 2, 2001

Related U.S. Application Data

(60) Continuation of application No. 09/384,650, filed on Aug. 27, 1999, which is a division of application No. 08/879,997, filed on Jun. 20, 1997, now Pat. No. 6,019,249.
(60) Provisional application No. 60/045,137, filed on Apr. 30, 1997.

(51) Int. Cl.[7] ................................................ G06F 11/00
(52) U.S. Cl. ............................ 221/75; 221/6; 221/100; 700/236; 700/242
(58) Field of Search ............................... 700/236, 242; 221/6, 75

(56) References Cited

U.S. PATENT DOCUMENTS

| | | | | | |
|---|---|---|---|---|---|
| 3,709,404 | A | * | 1/1973 | Dana | 221/120 |
| 4,023,704 | A | * | 5/1977 | Pitel et al. | 221/75 |
| 4,061,245 | A | * | 12/1977 | Lotspeich | 211/75 |
| 4,639,875 | A | * | 1/1987 | Abraham et al. | 364/479 |
| 4,757,915 | A | * | 7/1988 | Albright et al. | 221/75 |
| 4,811,764 | A | * | 3/1989 | McLaughlin | 141/98 |
| 4,847,764 | A | * | 7/1989 | Halvorson | 364/413.02 |
| 5,047,948 | A | * | 9/1991 | Turner | 364/479 |
| 5,205,436 | A | * | 4/1993 | Savage | 221/7 |
| 5,303,844 | A | * | 4/1994 | Muehlberger | 221/1 |
| 5,318,194 | A | * | 6/1994 | Wiese | 221/123 |
| 5,377,864 | A | * | 1/1995 | Blechl et al. | 221/2 |
| 5,445,294 | A | * | 8/1995 | Gardner et al. | 221/1 |
| 5,460,294 | A | * | 10/1995 | Williams | 221/2 |
| 5,502,944 | A | * | 4/1996 | Kraft et al. | 53/55 |
| 5,509,573 | A | * | 4/1996 | Campoli | 221/133 |
| 5,564,414 | A | * | 10/1996 | Walker et al. | 128/200.23 |
| 5,671,362 | A | * | 9/1997 | Cowe et al. | 395/228 |
| 5,706,976 | A | * | 1/1998 | Purkey | 221/6 |
| 5,745,366 | A | * | 4/1998 | Higham et al. | 364/479.14 |
| 5,881,910 | A | * | 3/1999 | Rein | 221/6 |
| 5,883,806 | A | * | 3/1999 | Meador et al. | 364/479.14 |
| 5,992,652 | A | * | 11/1999 | Springs | 211/59.3 |
| 6,105,791 | A | * | 8/2000 | Chalson et al. | 211/59.3 |

OTHER PUBLICATIONS

Pearson, Robert L., Cutting Costs Through Consolidation, Security Management, Dec. 1996.*

(List continued on next page.)

*Primary Examiner*—Donald P. Walsh
*Assistant Examiner*—Michael E. Butler
(74) *Attorney, Agent, or Firm*—Ralph E. Jocke; Daniel D. Wasil; Walker & Jocke

(57) ABSTRACT

A dispenser (10) for dispensing medical items (68, 70, 72) includes dispenser modules (28, 30) movably mounted thereon. The dispenser modules are selectively operative to dispense medical items therefrom into a path (54) which is connected to a delivery area (20) of the dispenser. The dispenser and the dispenser modules therein are configured to provide security against unauthorized access thereto. However an authorized user is enabled to readily access the dispenser modules and the medical items therein by unlocking a lock (22), opening a door (16) and extending the dispenser modules through an opening (18). With the dispenser modules in the extended position the medical items therein may be replenished. Alternatively, the dispenser modules may be disconnected from the dispenser and replaced with substitute dispenser modules.

9 Claims, 18 Drawing Sheets

OTHER PUBLICATIONS

Gannon, Kathi, NARD will keep pressing for an OTC legent''class, Oradell, Feb. 1993.*

Monroe, Judy, OTC drugs: Legal but could be lethal, Current Health, Dec. 1994.*

Williams, Joy, Charity, The Atlantic Monthly, pp 91–97, Jul. 1993.*

Forster, Jeff, The Rx–to–OTC switch marches on, Oradell Mar. 1996.*

* cited by examiner

APPARATUS FOR DISPENSING MEDICAL ITEMS

TECHNICAL HELD

This invention relates to devices for dispensing medical items. Specifically, this invention relates to a dispenser for dispensing varied types of medical items in a system which controls and tracks the use of medical items.

BACKGROUND ART

Medical items used in the treatment of patients often need to be tracked. Such medical items may include medications as well as medical devices and appliances. Such medical items come in various forms and sizes. For example, medications may be in the form of pills, capsules or caplets which are orally ingested. Alternatively, medications may be in liquid form. Liquid medications may be ingested, injected or applied topically to the patient. Similarly, medical devices vary from tiny machines which are implantable in the patient to larger items such as syringes, suction tubes and the like.

In the past the use of medical items by patients has been tracked manually. Medical providers would maintain paper records of inventories of medical items. As medical items were used for or by a patient, the use would be recorded. Paperwork was generated both for purposes of tracking the patient's treatment as well as for inventory and billing purposes. The manual tracking of medical items by patients particularly in large facilities became complex.

In recent years automated systems for controlling, dispensing and tracking the use of medical items have been developed. An example of such a system is shown in U.S. patent application Ser. No. 08/361,783 filed Dec. 16, 1994 and which is owned by the Assignee of the present invention. Such automated systems enable a medical technician to avoid much of the paperwork associated with tracking the use of medications, maintaining adequate inventories and billing patients. In such systems information concerning patients, medical items prescribed for the patients and medical items available for use by patients are stored in a data store. A user of the system, which is generally a health care provider such as a nurse or physician, uses a display terminal to select a patient and the medical items for the patient. In response to the user's input at the display terminal, the requested medical items are dispensed from a dispenser. The health care provider takes the item for use by the patient.

In the system owned by the Assignee of the present invention, the dispense of a medical item for a patient is recorded for several purposes. Information representative of the use of the item is stored in correlation with the patient's medical information for tracking the course of treatment and recovery. The use of the medical item is also recorded for billing purposes. This enables the patient's account to be charged for the value of the medical item. The use of the medical item is also recorded for purposes of tracking available inventories at various locations. This is done to assure that adequate supplies of medical items are available for dispense where they are needed. The disclosure of U.S. Ser. No. 08/361,783 is incorporated herein by reference as if fully rewritten herein.

The use of automated systems for dispensing medical items has resulted in a need for dispensers which can dispense medical items accurately and reliably in response to electrical signals. Such dispensers optimally should be capable of dispensing a wide range of medical items having various sizes and configurations.

Medical science is advancing rapidly. As science advances new and different types of medical devices and medications become available. Dispensers for medical devices must optimally be adaptable to new and different configurations of medical devices. Dispensers must be frequently refilled. Therefore it is desirable for such dispensers to be readily reloaded. Inventory of the items in dispensers must be frequently taken. There is a need for facilitating visual verification of the type and quantity of items which are in inventory in a dispenser mechanism.

Dispensers which are capable of dispensing various types of medical items may present difficulties because certain items are fragile and subject to breakage. It is sometimes desirable to dispense several medical items together as part of a kit. Such a system is disclosed in U.S. patent application Ser. No. 08/756,623 filed Nov. 26, 1996 which is owned by the Assignee of the present invention and the disclosure of which is incorporated herein by reference. Alternatively, health care providers may wish to dispense several different types of medical items in rapid succession, in which case several items will be delivered into a delivery location. If a fragile item is dispensed along with other items there is a possibility of breakage. Breakage is undesirable as it not only wastes a valuable medical item but may also contaminate the dispenser and may place it out of service until it can be cleaned. Thus, there is a need for medication dispensers that can dispense several types of medical items including fragile items together while minimizing the risk of breakage.

There is also a need to carefully monitor the use of narcotics. Steps are required by law to minimize the risk of theft of such items. It is desirable for medication dispensers to provide enhanced security which minimizes the risk that medical items may be taken from the dispenser through improper means. While enhanced security is desirable, authorized personnel who replenish medications or who service the dispenser should have ready access to the medications and dispenser mechanisms within the dispenser.

Thus, there exists a need for a dispenser for medical items that is capable of dispensing a wide variety of medical items, that reliably and accurately dispenses such items in response to electrical signals, that is easy to use and which provides enhanced security for preventing unauthorized access.

DISCLOSURE OF INVENTION

It is an object of the present invention to provide a dispenser for medical items.

It is a further object of the present invention to provide a dispenser for medical items that reliably dispenses requested medical items in response to electrical signals.

It is a further object of the present invention to provide a dispenser for medical items that provides enhanced security.

It is a further object of the present invention to provide a dispenser for medical items that is capable of dispensing items of various types and sizes.

It is a further object of the present invention to provide a dispenser for medical items that includes dispenser modules that can be readily reloaded either in the dispenser or at remote locations.

It is a further object of the present invention to provide a dispenser for medical items that makes it easier to take inventory of the number of medical items remaining in the dispenser.

It is a further object of the present invention to provide a dispenser for medical items that includes interchangeable dispenser modules.

It is a further object of the present invention to provide a dispenser for medical items that minimizes the risk of damage to items being dispensed.

It is a further object of the present invention to provide a dispenser for medical items that provides two independent ways for authorized personnel to gain access to the medical items and mechanisms housed in the dispenser.

Further objects of the present invention will be made apparent in the following Best Modes for Carrying Out Invention and the appended claims.

The foregoing objects are accomplished in a preferred embodiment of the invention by a dispenser apparatus that dispenses medical items. The dispenser apparatus includes an enclosure which bounds an interior area. The enclosure includes an opening to the interior area and a movable door which is movable between positions opening and closing the opening.

A plurality of dispenser modules are movably mounted on the enclosure. The dispenser modules are movable between first and second positions. In the first position the dispenser modules are housed within the enclosure and in the second position the dispenser modules extend through the opening when the door is in the open position. In the preferred form of the invention the dispenser modules in the second position may be replenished with medical items or disengaged from the dispenser and taken to a remote location for replenishment.

In a preferred form of the invention each dispenser module includes a holder for holding medical items and a dispenser mechanism for dispensing the items in the holder in response to electrical signals. The medical items are dispensed from each dispenser module at a dispense location. The dispenser modules are each mounted on guides which enable dispenser modules to be interchangeably positioned in the enclosure. When a dispenser module is in the first position within the enclosure, the dispense location of the module is positioned adjacent to a path. The path extends in the dispenser to a delivery area from which dispensed medical items may be taken by a user. The path includes at least one energy absorbing carom surface which slows and absorbs energy from dispensed items moving towards the delivery area to minimize the risk of breakage.

The dispenser modules and the path are configured to provide enhanced security. The configurations of the dispenser modules and the enclosure are such that improper efforts to gain access to the medical items will cause the path to be blocked. Holders and guides which are readily movable or disengaged from the dispenser modules when in the second position, cannot be moved or disengaged when the modules are in the first position.

The door of the dispenser includes a secure lock mechanism. In a preferred embodiment two independent modes are provided to enable authorized personnel to move the lock to an open condition. The modes include unlocking the lock in response to electrical signals. The lock may also be opened manually in the event that an electrical failure or malfunction of the electronic control system.

BEST MODES FOR CARRYING OUT INVENTION

Figure 1:
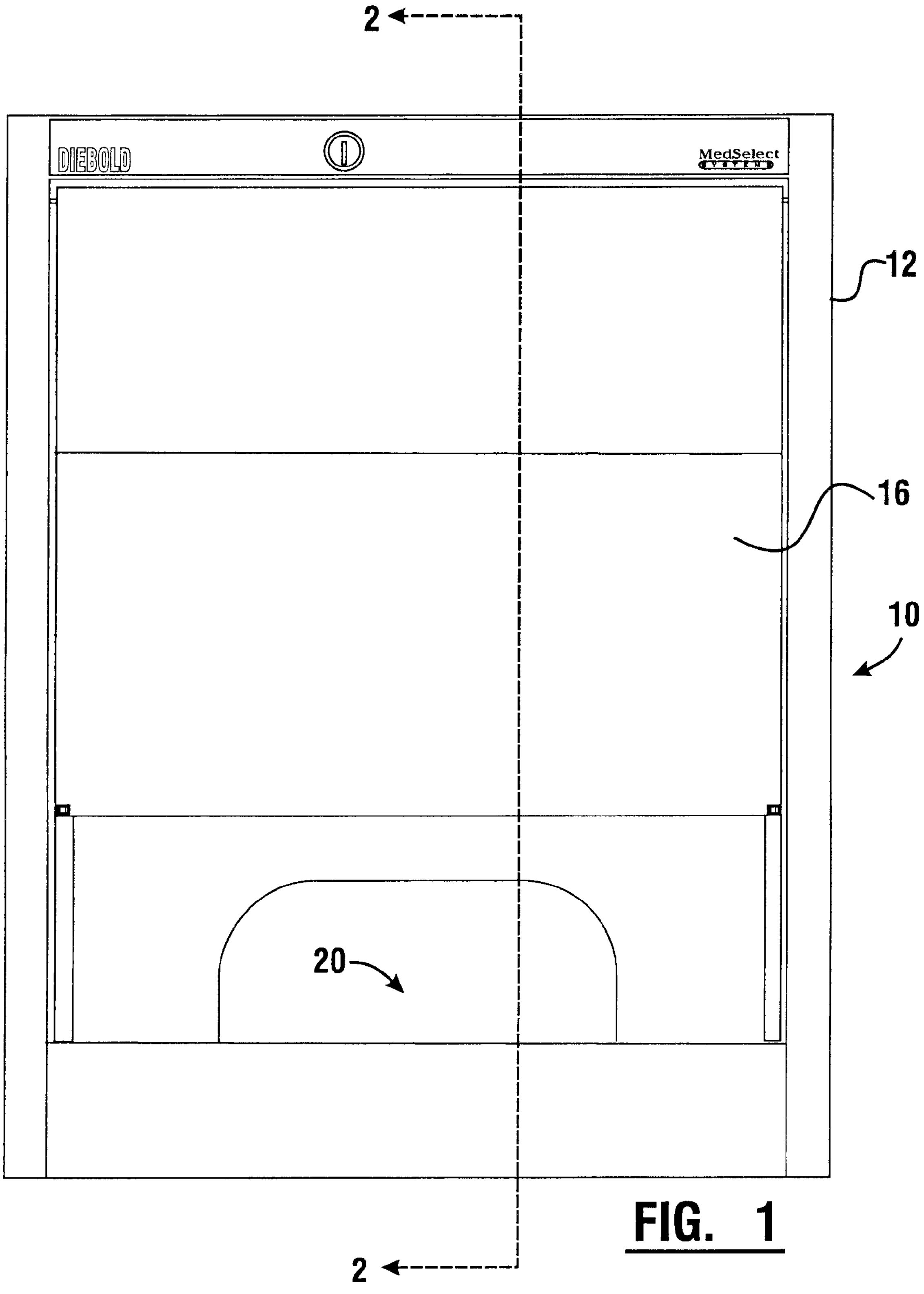
FIG. 1 is a front plan view of a dispenser for dispensing medical items of a preferred embodiment of the invention.

Referring now to the drawings and particularly to FIG. 1, there is shown therein a dispenser apparatus for dispensing medical items of a preferred embodiment of the present invention generally indicated 10. The dispenser is used as part of the system which is described in co-pending application Ser. No. 08/361,783 filed Dec. 16, 1994, the disclosure of which is incorporated herein by reference. Dispenser 10 includes an enclosure 12. The enclosure bounds an interior area generally indicated 14 as shown in FIG. 2.

Enclosure 12 has a door 16 movably mounted thereon. Door 16 is movable between a closed position shown in FIGS. 1 and 2 and an open position which is shown in FIG. 3. In the open position the door enables access through an opening generally indicated 18, to the interior area 14.

Dispenser 10 further includes a delivery area generally indicated 20. Medical items dispensed from dispenser 10 are accessible to a user in the delivery area as later described in detail.

Figure 2:
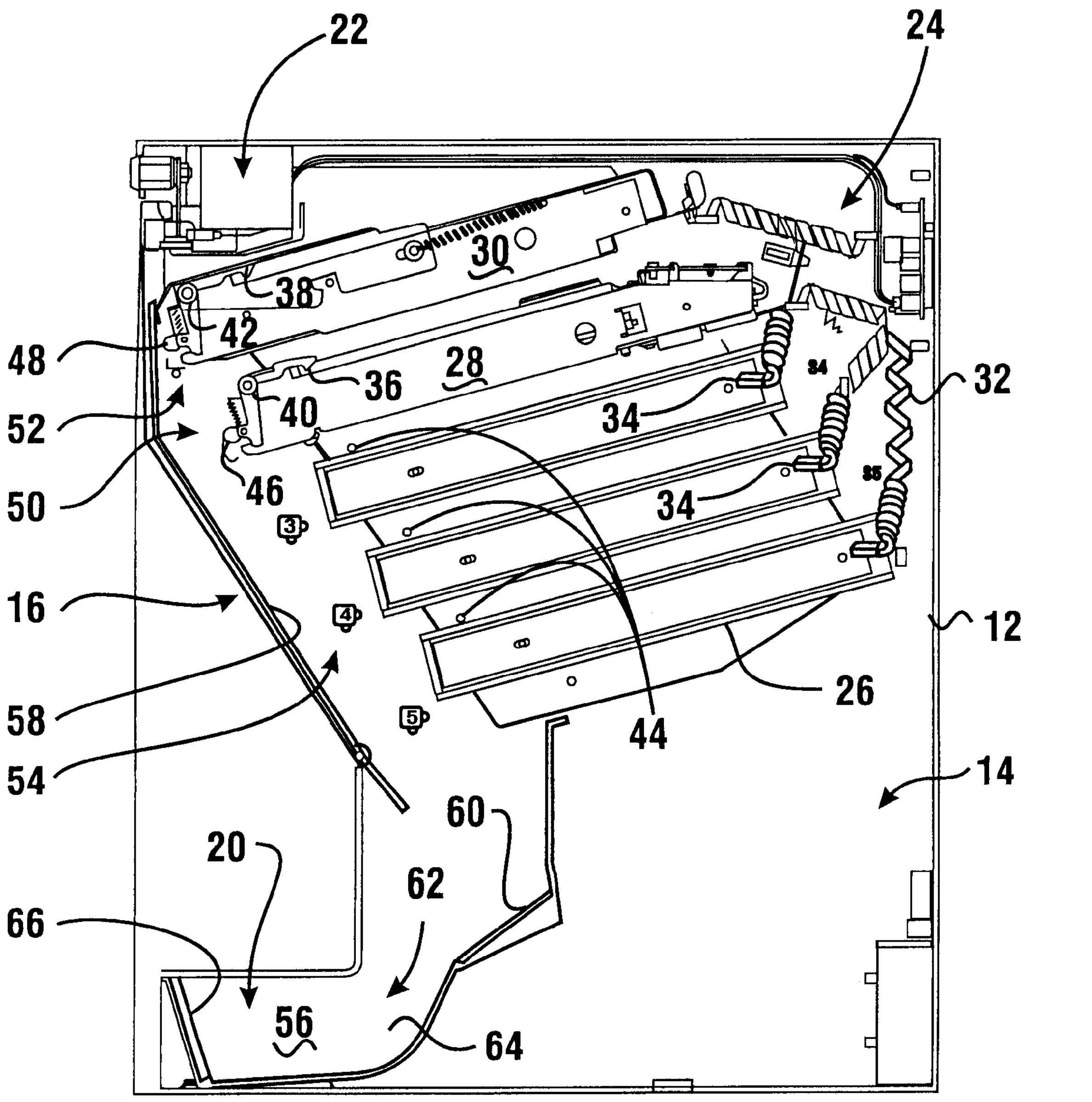
FIG. 2 is a schematic cross sectional view of the dispenser taken along the line 2—2 in FIG. 1.
Figure 3:
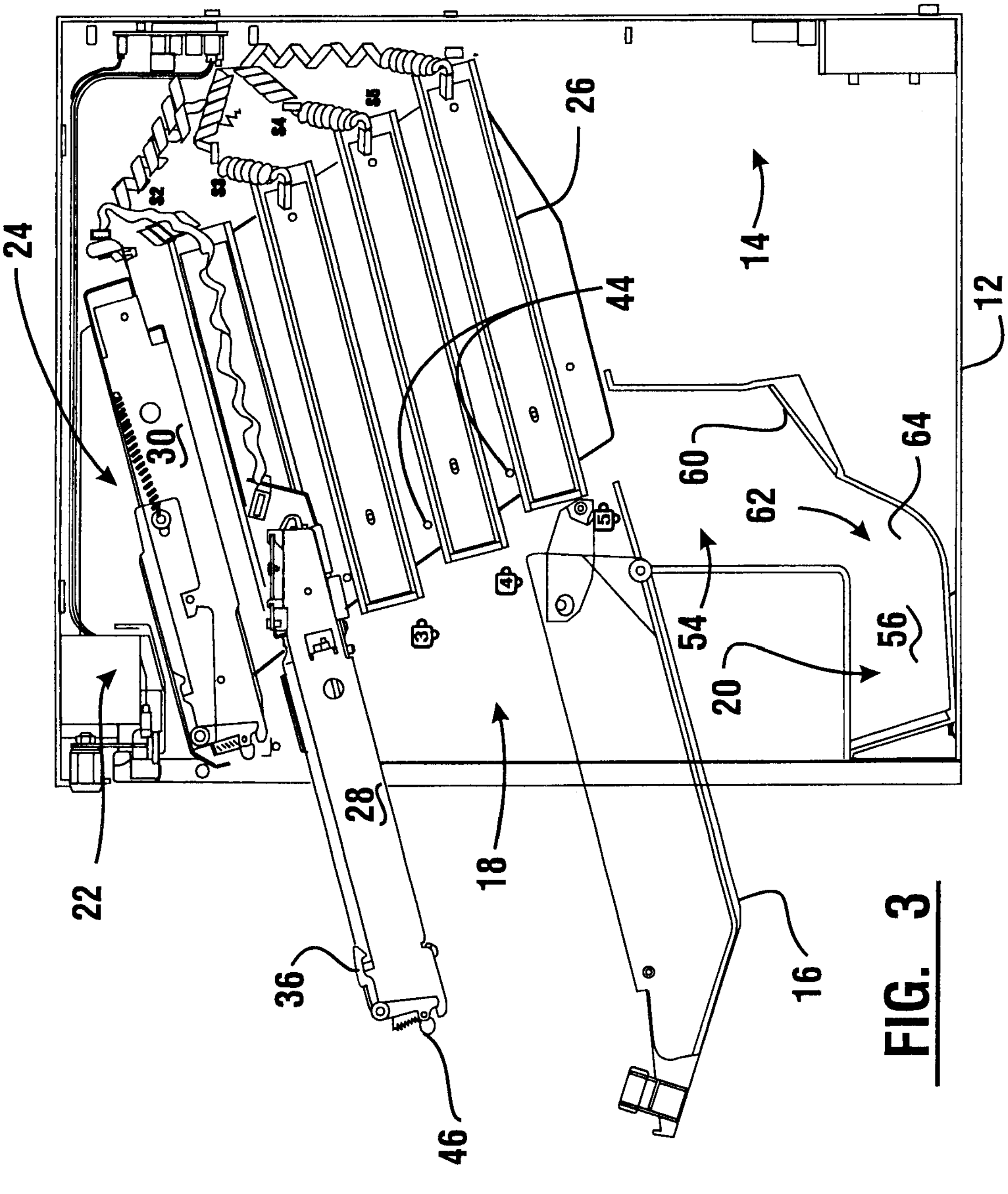
FIG. 3 is a view similar to FIG. 2 with the dispenser door in the open position and a dispenser module in an extended position.

As shown in FIG. 2, enclosure 12 further includes a lock 22 thereon. Lock 22 which is later described in detail is operative to hold door 16 in a closed position. Lock 22 includes two independently actuatable unlocking mechanisms which enable changing the lock from a locked to an unlocked condition so door 16 may be opened.

As shown in FIGS. 2 and 3, enclosure 12 has mounted thereon a plurality of dispenser modules 24. Dispenser modules 24 are movably mounted on guides 26 in enclosure 12. Guides 26 preferably comprise transversely disposed pairs of guides which enable dispenser modules 24 to move in sliding engagement thereon. Each of the dispenser modules further includes thereon a pair of disposed guide tracks which engage the guides 26 in slidable relation. Guides 26 may be conventional types which operate in a manner hereinafter described. It should be understood that although in FIGS. 2 and 3 only five spaces are shown for dispenser modules 24, in other embodiments of the invention additional guides and dispenser modules may be used.

Shown positioned within enclosure 12 in FIG. 2 is a first type of dispenser module 28 and a second type of dispenser module 30. Dispenser module 28 which is described in detail later, is preferably configured for dispensing medical items such as medications of the pill or caplet type. Dispenser 30 is of a type that dispenses medical items that are housed in cylindrical containers, including containers which hold liquid medications. The dispenser mechanism in dispenser module 30 is preferably the type shown in U.S. patent application Ser. No. 08/361,783 filed Dec. 16, 1994 which is incorporated herein by reference. It should be understood that dispenser modules 28 and 30 are exemplary, and that other types of medication dispensing modules may be used in other embodiments. The dispenser modules are preferably interchangeable on guides 26. In FIGS. 2 and 3, only two dispenser modules 24 are shown for purposes of simplicity. Dispenser modules may be mounted on each pair of guides 26.

The dispenser modules 24 are controlled by electrical signals which are delivered through a plurality of wiring harnesses generally indicated 32. Wiring harnesses 32 extend in the interior area 14 of enclosure 12. Each wiring harnesses 32 terminates in a connector end 34. Connector ends 34 are engageable with coupling ends on the dispenser modules and provide a quick connect/disconnect electrical coupling for connecting each wiring harness to a dispenser module.

Figure 7:
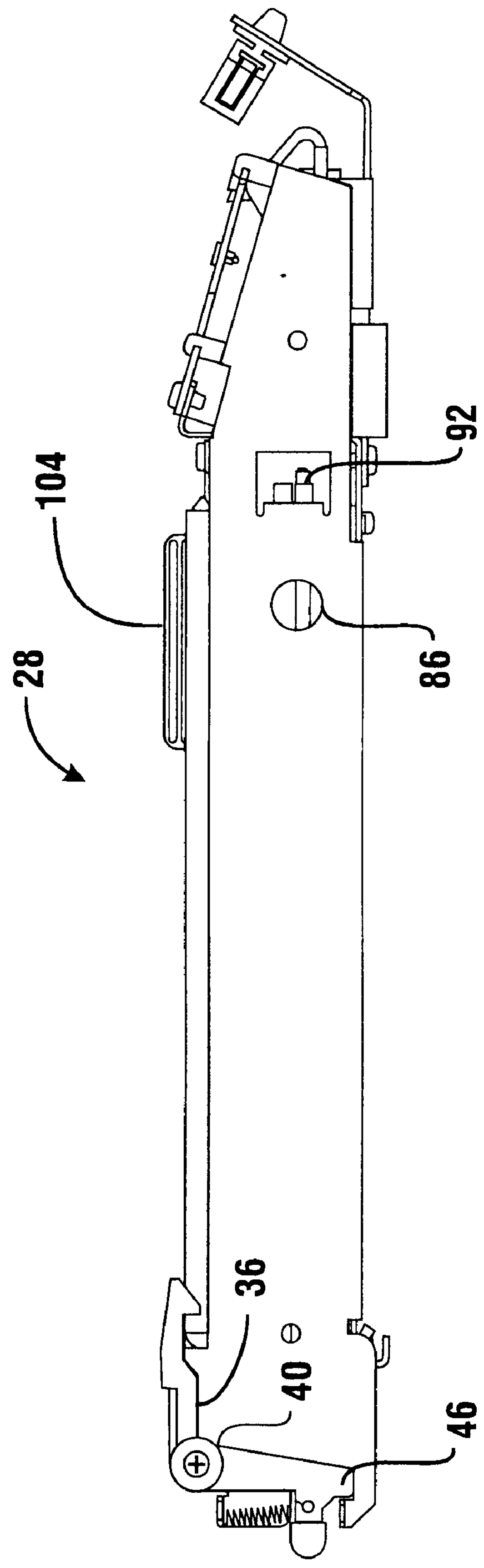
FIG. 7 is a side view of the dispenser module shown in FIG. 5.

Dispenser modules 28 and 30 each include a pair of spring-loaded latching levers adjacent to the front ends thereof. Latching levers 36 extend on dispenser module 28. Similarly, a latching lever 38 extends on dispenser module 30. The latching levers 36 and 38 are movably mounted about pivots 40 and 42, respectively. The latching levers are biased downwardly by springs to engage latching pins 44 which extend adjacent to each of guides 26. The engagement of the latching levers with the latching pins holds the dispenser modules in position to dispense medical items within enclosure 12. Latching levers 36 each include a release portion 46. Release portion 46 is manually movable to cause latching lever 36 to disengage from a latching pin 44. Latching lever 36 and release portion 46 are shown in greater detail in FIG. 7. Latching levers 38 also include release portions 48 which are operative to move the latching lever 38 to disengage from a latching pin. When the dispenser modules are disengaged from the latching pins the dispenser modules may be moved outwardly through opening 18 on guides 26.

Dispenser module 28 includes a dispense location generally indicated 50, which is adjacent to a front end thereof. Dispense location 50 is where medical items are dispensed from the dispenser module 28. Dispenser module 30 also includes a dispense location generally indicated 52. Dispense location 52 is similarly located adjacent to a front end of dispenser module 30. When the dispenser modules are positioned in the dispenser, dispense locations 50 and 52 extend adjacent to a path generally indicated 54. Path 54 extends from the dispense locations on the dispenser modules to the delivery area 20. Delivery area 20 includes a pocket generally indicated 56.

Path 54 is bounded in an area adjacent to the dispenser modules by an interior surface 58 of door 16. In the operative position of the dispenser modules the dispense locations thereof are disposed not only upwardly, but also in closer proximity to the interior surface of the door with increasing proximity to the top of the dispenser. This minimizes the risk that medical items dispensed from a dispenser module located vertically above other dispenser modules will engage or otherwise interfere with the lower dispenser modules or items being dispensed therefrom.

The preferred embodiment of the invention is enabled to be used with various types and sizes of medical items. When several medical items are being dispensed together as part of a kit, such as disclosed in U.S. patent application Ser. No. 08/756,623 filed Nov. 26, 1996 the disclosure of which is incorporated herein by reference, several items may be dispensed from the dispense locations into path 54 simultaneously. Such medical items will all move downward in path 54 and collect in pocket 56 of the delivery area. Several medical items may also collect in pocket 56 when medical items are dispensed in rapid succession. Because certain medical items may be fragile or subject to breakage, there is a risk that medical items may impact one another and break or otherwise be damaged.

The risk of damage to dispensed medical items is minimized in a preferred embodiment of the present invention by an angled carom surface 60 at a lower end of path 54. Carom surface 60 is positioned in a throat area generally indicated 62, wherein path 54 narrows horizontally (see FIG. 13). Carom surface 60 is covered with material which absorbs energy from medical items landing thereon. Carom surface 60 is angled and has a low surface friction value to assure that medical items which land thereon will not stick or be hung up on the carom surface. This feature is particularly useful for lightweight items.

Items which have engaged the carom surface fall downwardly through an elbow area 64 in path 54 and are directed into pocket 56. To minimize possible damage due to forward momentum from engagement with carom surface 60 and the surface bounding elbow area 64, pocket 56 includes a stop surface 66 which is coated with energy absorbing material. The interior surface of door 16 includes a guide 58 attached thereto. Guide 58 is preferably comprised of plastic material and directs medical items in the path 54 to engage carom surface 60. The guide 58 provides smoother and quieter dispensing operation and minimizes the risk of damage to dispensed medical items.

Figure 13:
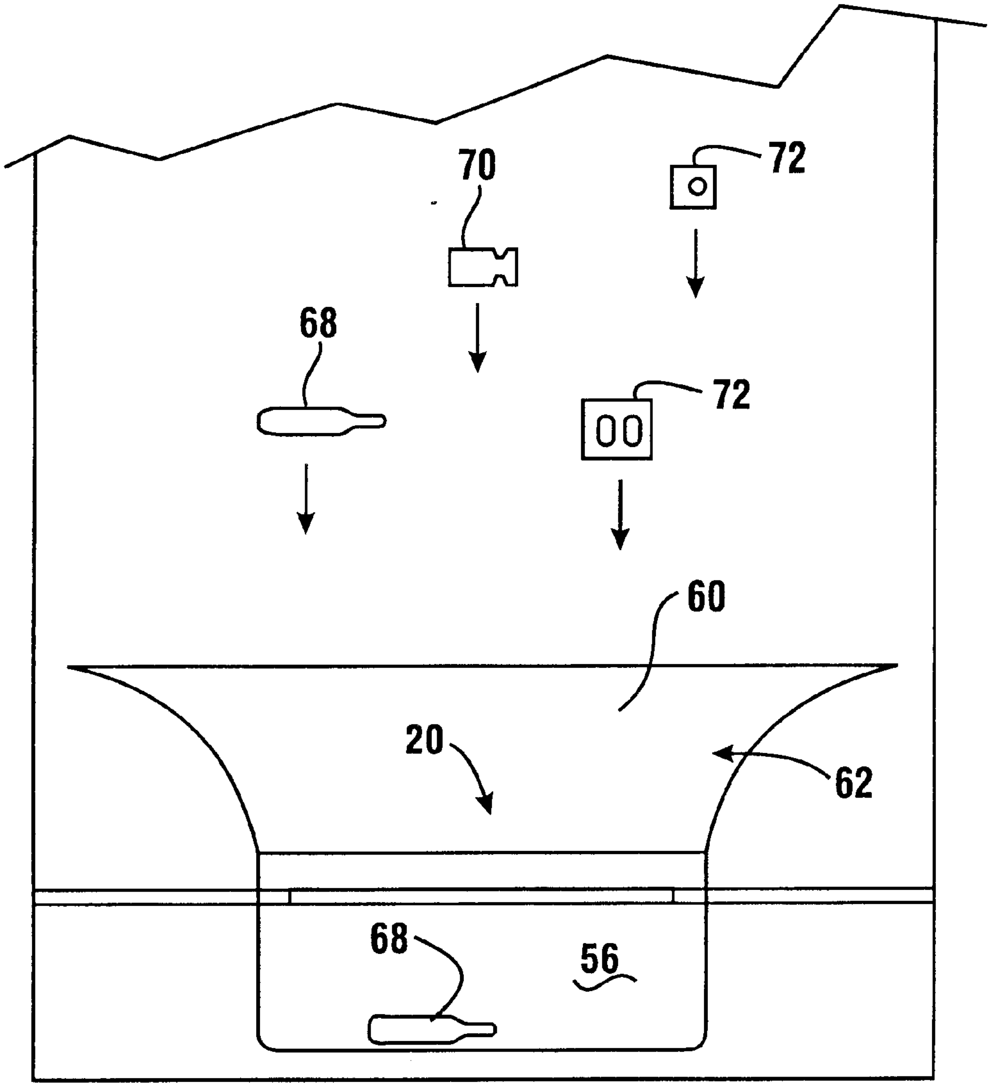
FIG. 13 is a transparent partial plan view of the dispenser shown in FIG. 1 and the path taken by dispensed medical items.

As can be appreciated from FIG. 13, medical items such as ampules 68, vials 70 and cards 72 with pills or capsules attached thereto are directed by the guide 58 on the inside of door 16 to fall downwardly into engagement with carom surface 60. Upon engagement with carom surface 60, much of the downward momentum gained by the medical items while falling through the upper portions of path 54 is lost to the energy absorbing material on the carom surface. Thereafter the medical items slide off the carom surface and slide on the generally low friction plastic surface bounding elbow area 64 until they reach the pocket 56 in delivery area 20. Relatively heavy medical items such as ampules 68 and vials 70 may gain further forward momentum as they pass through the elbow area. The risk of damage due to collisions with such items is minimized by the energy absorbent stop surface 66. Medical items which land near the sides of the carom surface engage the curved side walls of the elbow area which further reduces forward momentum. The dispensed medical items collect in pocket 56 until removed by a user.

The configuration of path 54 provides enhanced security against improper access to the medical items in the dispenser modules 24. The opening to delivery area 20 is relatively small to restrict access into the interior area of the dispenser. Elbow area 64 is turned and throat area 62 is sufficiently small that a person attempting to pass a hand or tool upwardly therein to reach the dispenser modules would find it difficult to do so. Attempts by such a person to dislodge medications held in the dispenser modules are not likely to disengage the latching levers from latching pins 44 because there are two latches holding each dispenser module in position. However, if a dispenser module is unlatched the dispenser module will move forwardly on guides 26 due to the force of gravity. An unlatched dispenser module will move in a forward direction until it engages the guide 58 which comprises an interior face of the door. A dispenser module in this position blocks the path 54. This prevents an unauthorized person from gaining access through the path to the medical items housed on the dislodged dispenser module or on dispenser modules located above the dislodged dispenser module. The unlatched dispenser module renders the dispenser module at least partially inoperative and its improper position is apparent to a person opening the door to the dispenser. This provides an indication of tampering. Each of the dispenser modules 28 and 30 includes further features for preventing the unauthorized access to medications therein which are hereinafter described.

A fundamental aspect of the preferred embodiment of the present invention is that the dispenser modules 24 are selectively movable for purposes of loading the dispenser modules with medical items or inventorying items housed thereon. As shown in FIG. 3, with lock 22 in an unlocked condition door 16 may be moved to an open position. In the open position of door 16 the dispenser modules 24 may be moved outwardly on guides 26. The dispenser modules may be moved outwardly through the opening 18 after unlatching the latching levers from the latching pins 44 in the enclosure.

In FIG. 3, dispenser module 28 is shown in the outward position. In the outward position the medical items in the holders on the dispenser modules may be inventoried or replenished in a manner hereinafter discussed. After the activities related to dispenser module 28 have been completed, it may be moved back inward into the enclosure until the latching levers 36 again engage pins 44 and another dispenser module, such as dispenser module 30, may be moved outward through the opening.

Figure 4:
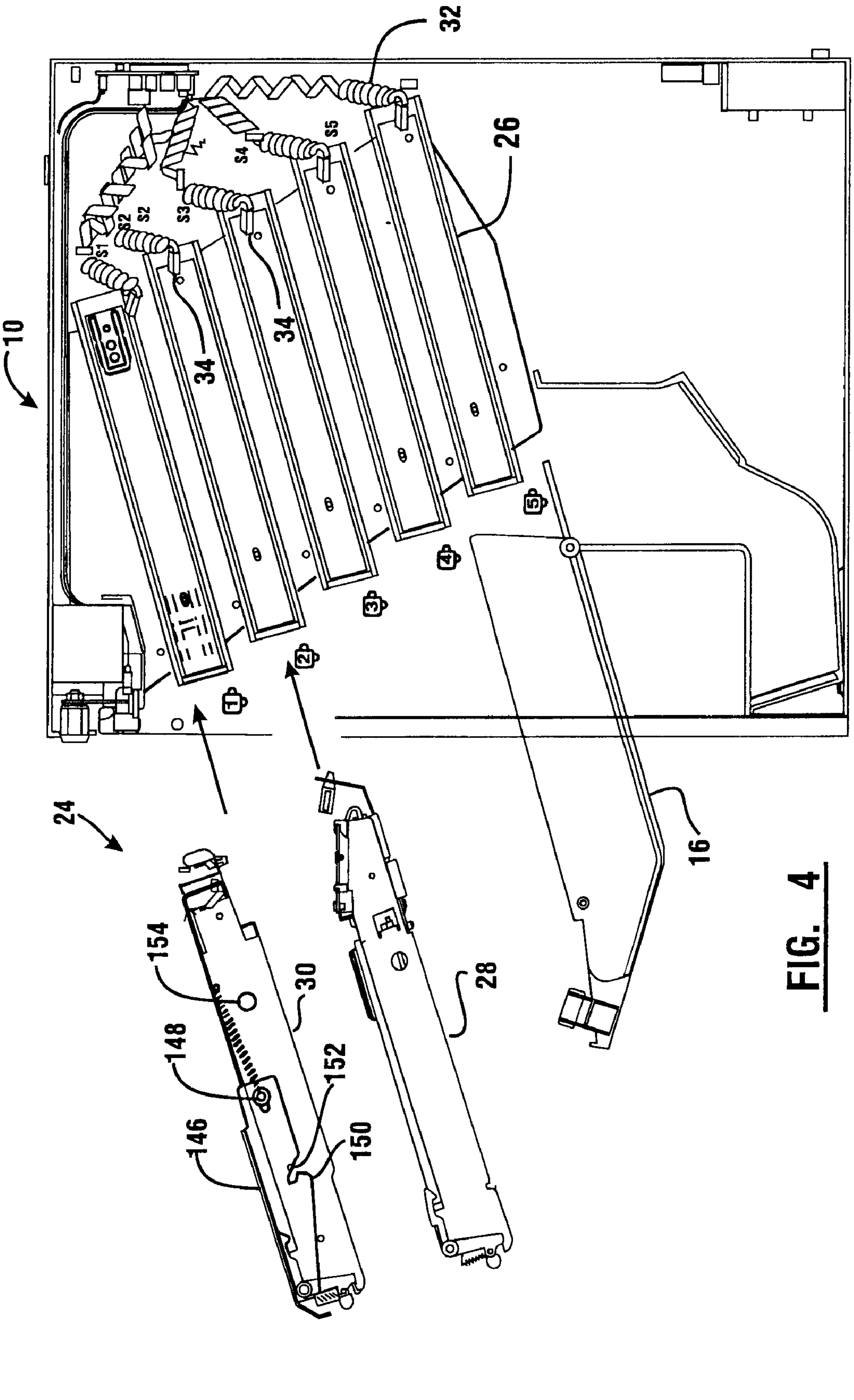
FIG. 4 is a view similar to FIG. 3 showing the dispenser modules removed from the dispenser.

The guides 26 on which the dispenser modules 24 are mounted preferably include stops. The stops limit the outward travel of the dispenser modules through the opening to a distance sufficient for purposes of replenishment or inventorying the medical items thereon. The guides normally hold the dispenser modules through the guide tracks, and limit movement of the modules to sliding motion along the direction of the guides. However as shown in FIG. 4, in a preferred embodiment of the invention the guides 26 enable the dispenser modules to be completely released from the enclosure using conventional release mechanisms in connection with guides 26 and the guide tracks. The quick disconnect capability of the connector ends 34 on to wiring harnesses 32 enable the dispenser modules 24 to be electrically disconnected from the dispenser 10. This enables the dispenser modules to be taken to a remote location for replenishment, inventory purposes, a modification in configuration or for repair. The same or substitute dispenser modules may be reinstalled in connection with the guides and placed back in service in the dispenser 10.

One embodiment of dispenser module 28 is now described with reference to FIGS. 5 through 11. Dispenser module 28. includes a plurality of holders thereon for holding a plurality of different types of medical items. Each holder includes a spiral member or helix 74. Each helix is selectively rotatable by a dispenser mechanism which includes a rotating mechanism generally indicated 76. Each rotating mechanism preferably includes an electric motor 82 (only a portion of which is shown) and a spool 78. Spool 78 includes tabs thereon for releasibly holding the helix 74. Each helix also has a free end 80 which is positioned adjacent to the dispense location indicated 50 which is at the front of the module 28.

Figure 6:
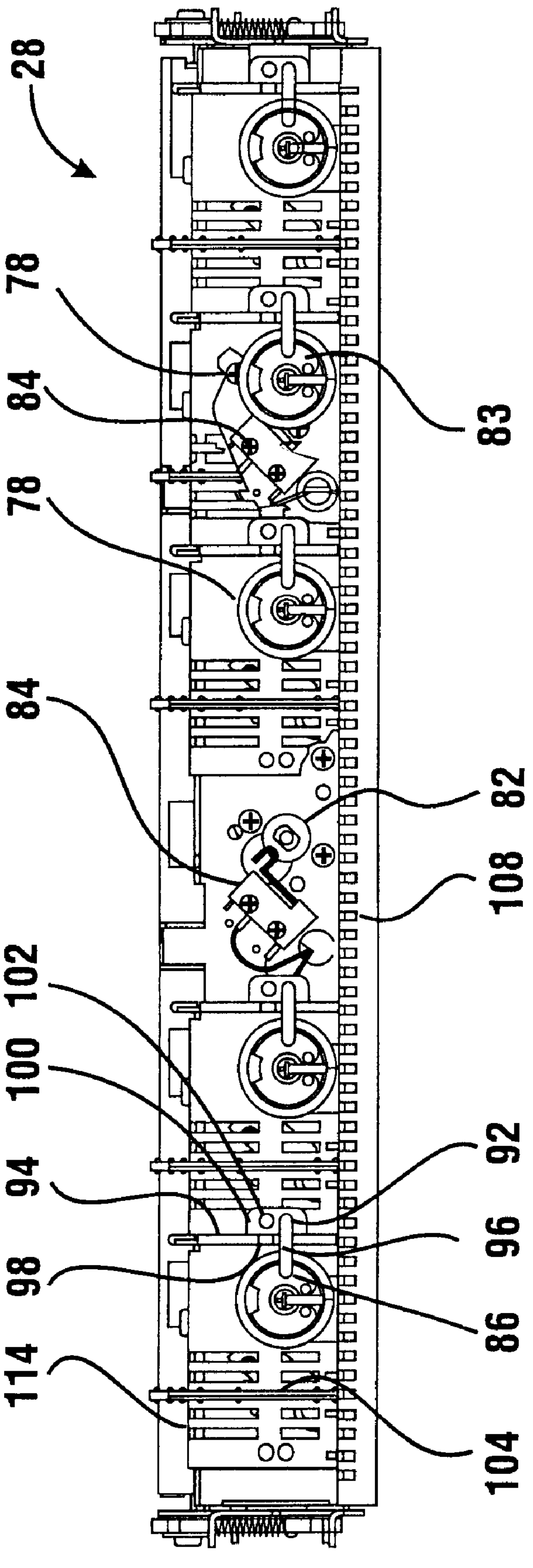
FIG. 6 is a partially sectioned front view of the dispenser module shown in FIG. 5.

As shown in FIG. 6, each spool 78 has in connection therewith a cam 83 and a cam operated switch 84. The cam and cam switch enable monitoring the rotational position of the helix 74. This enables the electric motors which are part of the rotating mechanisms 76 to accurately make one rotation in response to electrical signals delivered thereto. As will be appreciated by those skilled in the art, the rotation of each helix 74 one turn causes a medical item held thereon to be moved towards dispense location 50 adjacent the free end 80 of the helix. A medical item is preferably positioned in nested relation in each turn of the helix 74. As a result, with each rotation of the helix by the rotating mechanism one medical item is moved outwardly to disengage the free end 80 of the helix and to fall into path 54 when the dispenser module is mounted in the dispenser.

Figure 5:
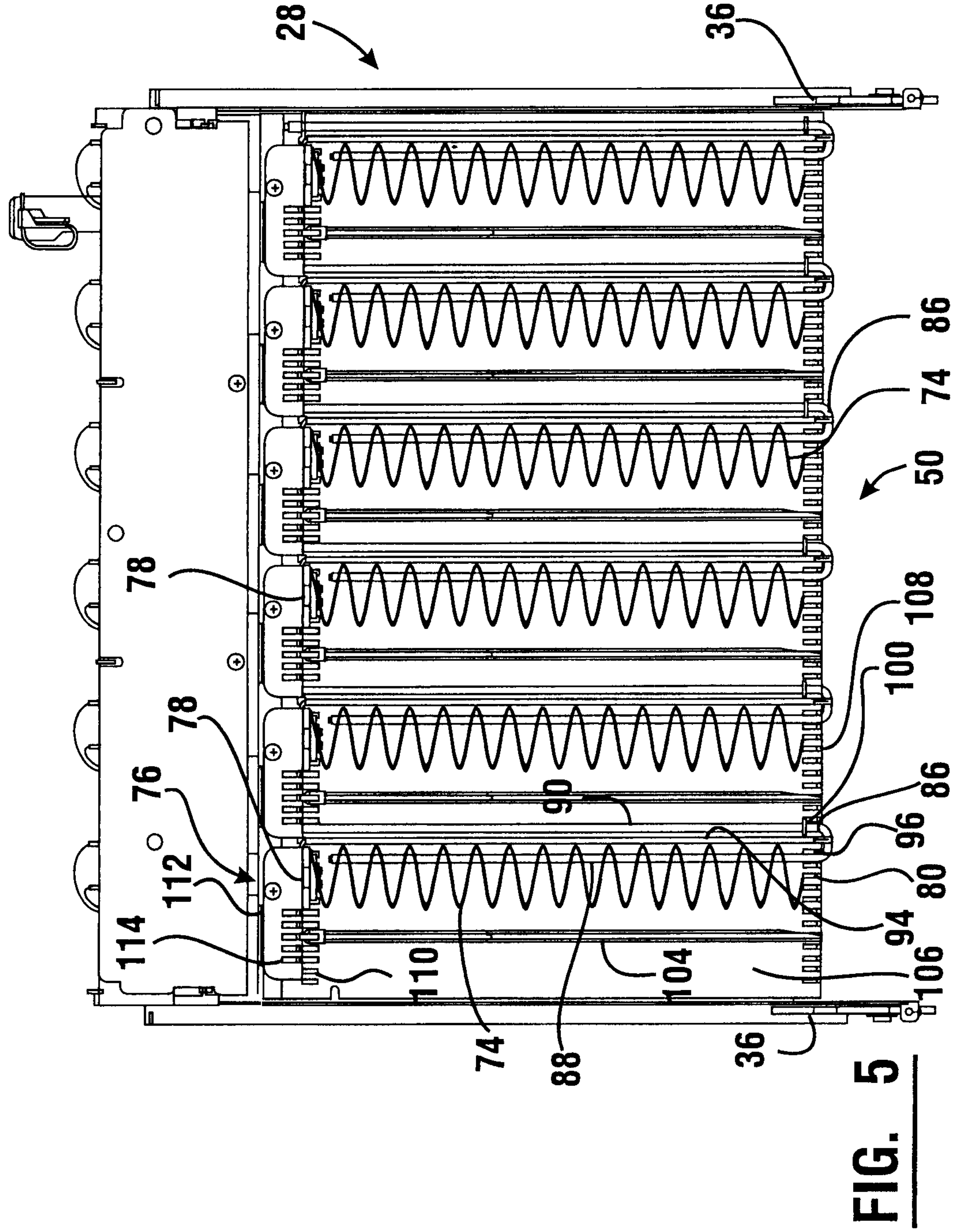
FIG. 5 is a top plan view of a first type of dispenser module configured for dispensing solid medications.

It should be appreciated that although all six of the helixes 74 shown in dispenser 28 in FIG. 5 are of the same size and pitch, various sized helixes may be used. Different sized and pitched helixes may be used for dispensing different sized medical items. For example, a larger helix suitable for handling larger sized medical items will have fewer turns for a given length. As a result, such a helix will hold fewer medical items within the given length. A smaller helix will be suitable for handling smaller medical items and will have more turns and thus hold a larger number of medical items within the given length. As later discussed, this feature is used to advantage in a preferred form of the present invention by providing indicia on the dispenser module indicative of the number of medical items remaining in a helix.

A novel aspect of the preferred embodiment of the present invention is that each helix is secured in position by a u-shaped holder guide 86. Each holder guide includes a first portion 88 which extends in a longitudinal direction in an interior area of the helix 74. Each holder guide further includes a second portion 90. Second portion 90 extends in the longitudinal direction in an exterior area of the helix 74. In the preferred form of the invention second portion 90 includes an engaging end 92 which is movably positionable in an opening in a wall that extends adjacent to helix 74.

As shown in FIG. 5, a guide wall 94 extends adjacent to each helix 74 and is fixably attached to dispenser module 28. Guide wall 94 in the embodiment shown serves to help guide and position the medical items held on helix 74 as they are moved forward thereon. As best shown in FIG. 6, holder guide 86 includes a closed end portion 96. Closed end portion 96 is generally u-shaped and connects the first and second portions of the holder guide. Free end 80 of helix 74 passes through the holder guide as the helix rotates.

Guide wall 94 includes a pair of notches 98 at its forward end. Closed end portion 96 in the operative position extends through one of notches 98. Guide wall 94 also includes a tab 100 adjacent to its outward end. Tab 100 includes a pair of apertures 102. Holder guide 86 also extends through one of the apertures 102. This further helps to position the holder guide in a proper location as well as to constrain its movement.

Unauthorized persons attempting to obtain the medical items housed within the dispenser 10 may seek to dislodge the medical items held on the helixes 74. The holder guides 86 are operative to minimize the chance that this may occur. The first portion 88 of the holder guides which extends in the interior area of the helix prevents the helix from being disengaged from the holder guide 86. In addition, the closed end portion 96 prevents significant movement of the helix outwardly so that few if any medical items can be dislodged by using a tool that attempts to pull outwardly on the helix. A further aspect of the holder guides is that the engagement of the closed end portion 96 in one of notches 98 and apertures 102 makes it difficult to engage the holder guide when it is in position within the enclosure.

If by chance the engaging end 92 is disengaged from the opening to which it is releasibly attached by a person attempting to compromise the dispenser, the holder guide is constrained to move forwardly by the aperture 102. Any such attempted forward movement of the holder guide is limited by engagement of the holder guide with the interior surface 58 of the door 16 when the door is in the closed position. As a result, in the unlikely event that an unauthorized person is successful in dislodging the holder guide, the distance that the helix may be moved is very limited and the number of medical items that could be obtained in this manner is limited.

Authorized personnel who open the door 16 of the enclosure are enabled to readily remove the holder guide. This is accomplished because in the open position of the door the holder guide is enabled to be moved forwardly through the aperture 102 an unlimited amount. This is done when reconfiguring the dispenser module 28 by installing a different sized helix. It should be noted that the purpose of the multiple notches 98 and apertures 102 on guide wall 94 is to enable the holder guide 86 to be selectively positioned so as to extend in the proper location in the interior area of the helix. In addition, multiple openings are provided for engaging end 92 so it may be positioned in alignment with the notches and apertures in which the holder guide is positioned. This enables an authorized person to rapidly change the size and type helixes used in the dispenser module 28.

Figure 9:
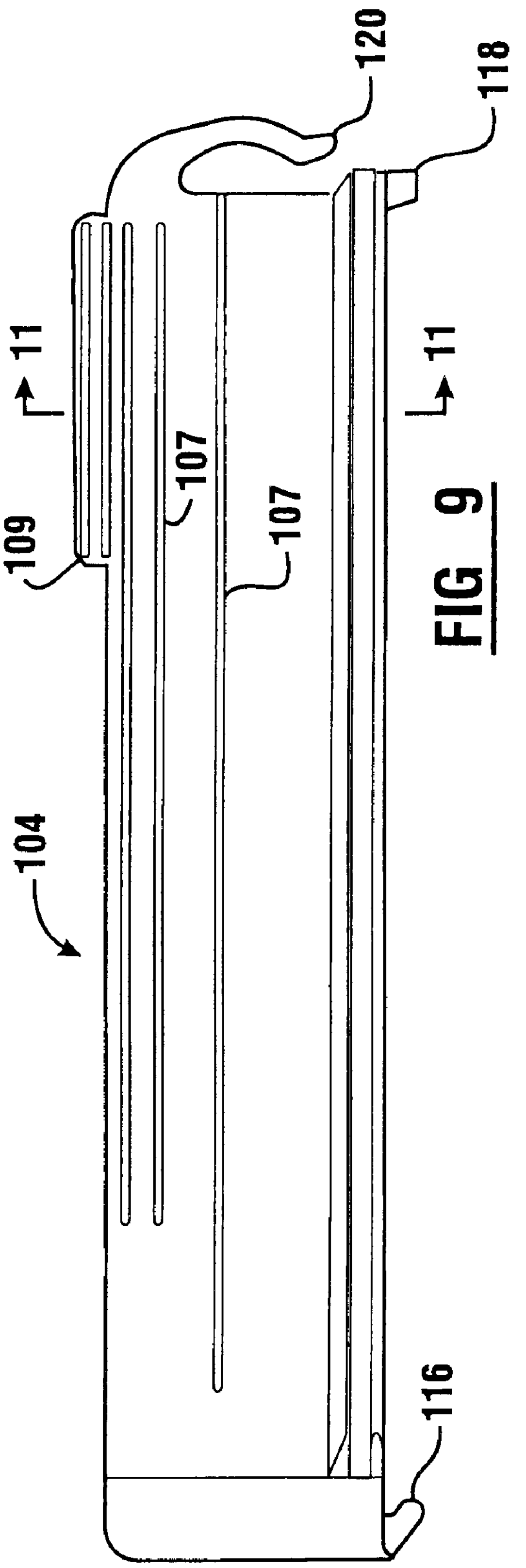
FIG. 9 is a side view of a guide used in connection with a dispenser module shown in FIG. 5.
Figure 10:
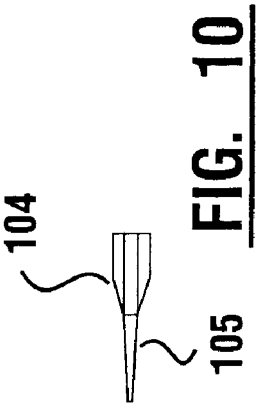
FIG. 10 is a top view of the outer end of the guide shown in FIG. 9.
Figure 11:
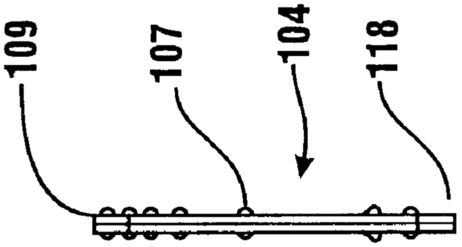
FIG. 11 is a cross sectional view of the guide taken along line 11—11 in FIG. 9.

Dispenser module 28 further includes a plurality of guides 104. Each guide 104 which is shown in greater detail in FIGS. 9–11, is selectively positionable in disposed parallel relation with each guide wall 94. Each guide 104 is operative to help guide medical items supported on the adjacent helix 74 outwardly towards the free end of the helix.

Dispenser module 28 includes a supporting surface generally indicated 106 which in the embodiment of the invention shown, extends across the bottom of the dispenser module 28. Supporting surface 106 includes a plurality of first slots 108 which are uniformly spaced thereon. Supporting surface 106 further includes second slots 110 disposed rearwardly and in alignment with each of first slots 108.

Dispenser module 28 further includes support brackets 112. Support brackets 112 include a vertically extending wall portion which extends adjacent to spool 78. Support bracket 112 further includes a generally horizontally extending wall portion which includes third slots 114 therein. Third slots 114 extend in aligned relation with second slots 110. In addition, third slots 114 extend downwardly a portion of the length of the vertically extending wall portion.

Guide 104 includes a hook portion 116 adjacent a first end. Guide 104 further includes a rear tab 118 and a finger portion 120. The downward and rearward configuration of tab portion 116 is operative to minimize the risk that guide 104 when engaged on dispenser module 28, can be disengaged by unauthorized persons attempting to gain access to the medical items in the dispenser. This is because the hook portion 116 when engaged in a first slot 108, cannot be readily moved out of engagement with the slot unless the guide is moved substantially upwardly adjacent to the rear tab 118 and finger portion 120. In the operative position of the dispenser module within enclosure 12 such upward movement is prevented either by an adjacent dispenser module, or in the case of an uppermost dispenser module by an interior wall bounding the enclosure.

As will be appreciated from FIGS. 5 and 6, guides 104 are selectively engaged with slots 108, 110 and 114 so that guide 104 extends a desired distance transversely disposed from corresponding guide wall 94. The distance that guide 104 is disposed from the guide wall depends on the physical size of the medical item held on the adjacent helix 74.

The installation of guide 104 requires that portion 116 be first engaged in one of first slots 108. Because of the configuration of hook portion 116 the engagement of the hook portion requires that the end of guide 104 including the finger portion be substantially raised relative to the supporting surface 106. Once the hook portion is engaged with a first slot 108, the opposed end of guide 104 is moved downwardly. As this is done rear tab 118 engages an aligned second slot 110. Finger portion 120 extends in an aligned third slot 114 and it is engaged to the vertically extending wall portion. This engagement at three points holds the guide 104 in position.

Conversely, the removal of the guide requires first raising the end of the guide containing rear tab 118 and finger 120. Only after the end of guide 104 opposed from hook portion 116 has been sufficiently raised can the hook portion be disengaged from first slot 108. This is readily accomplished when the dispenser module 28 is in the position shown in FIG. 3. However when the dispenser module is in the operative position within the enclosure as shown in FIG. 2, any upward movement of the guide 104 at the end adjacent to finger 120 is restricted by the adjacent dispenser modules and/or the interior wall of the enclosure. As a result, any person attempting to gain unauthorized access to the medical items within the dispenser using a tool in the path 54, will find it difficult to achieve access to the medical items by dislodging guides 104.

As shown in FIG. 10, guides 104 include a tapered front portion 105. Tapered portion 105 is positioned above hook portion 116 when the guide is in the operative position. As shown in FIG. 11, guide 104 includes elongated protuberances 107. The protuberances 107 serve to support medical items and minimize frictional resistance to movement. A tab portion 109 of the guide 104 also includes protuberances thereon which facilitate manually engaging the guide during installation and removal.

Figure 8:
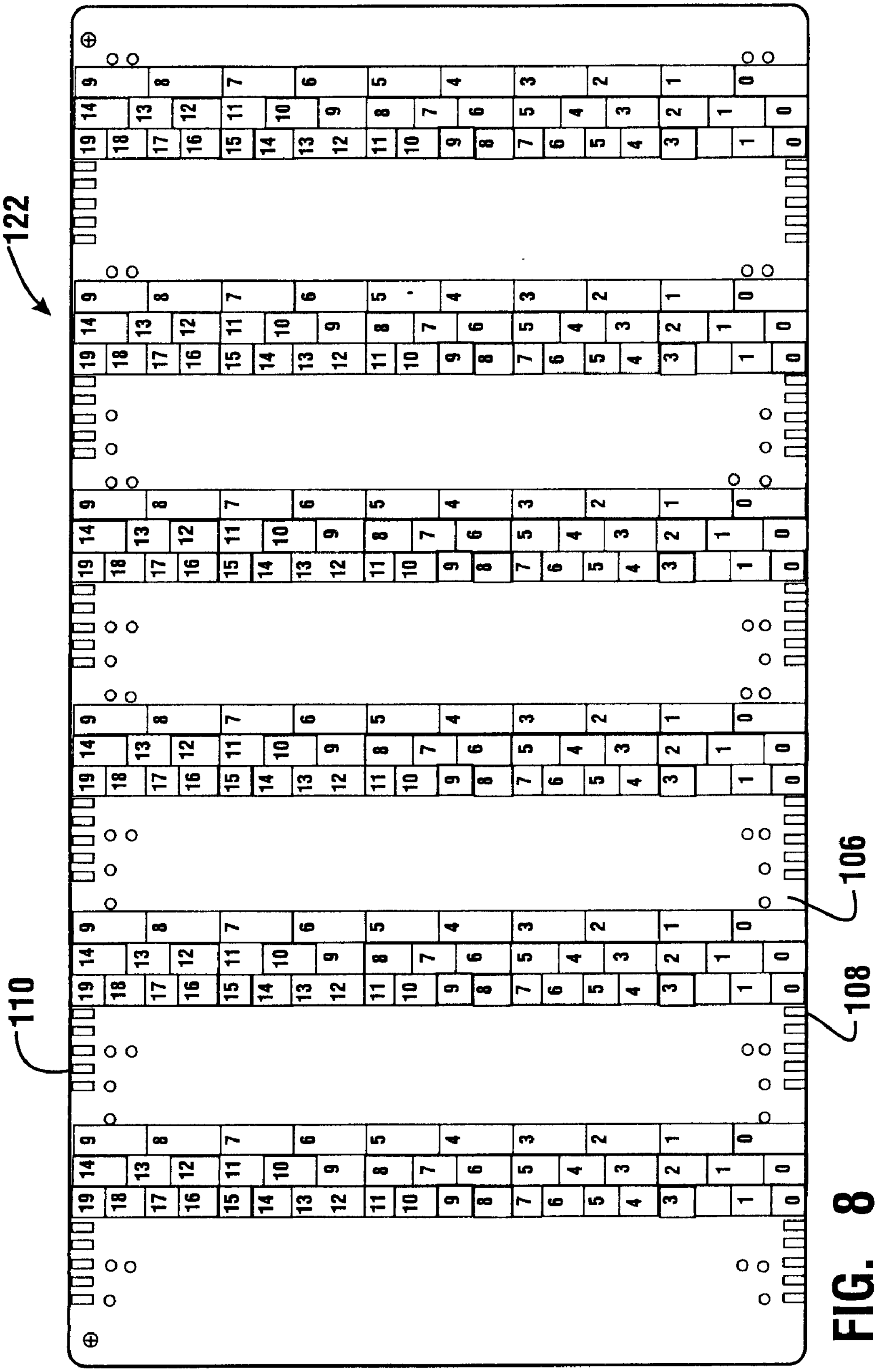
FIG. 8 is a top plan view of a reference surface of the dispenser module shown in FIG. 5 with indicia thereon for indicating the number of medical items remaining in each holder of the dispenser module.

A further fundamental advantage of the preferred form of dispenser module 28, is that supporting surface 106 serves as a reference surface with indicia thereon which helps a user to readily determine the number of medical items being held in a helix. FIG. 8 shows indicia generally indicated 122 which extend on supporting surface 106. Indicia 122 are spaced in aligned, side by side relation and correspond with the pitch of the turns in one of to three different sized helixes. As can be appreciated from FIG. 8, the helixes which are attached to spool 78 extend adjacent to and above indicia 122. The turns of the helix are positioned such that a user reviewing the indicia from above is able to observe the numbers corresponding to the helix through the turns of the helix. This makes it apparent which of the three sizes of helixes is installed. The indicia 122 are positioned so that the first number which is exposed is indicative of the number of medical items which are being held in the helix. This enables the user to quickly observe how many medical items are remaining on the helix for inventory purposes.

The use of the indicia in the preferred embodiment avoids the need for a user to have to count medical items held in a helix. This greatly reduces the time necessary for purposes of taking inventory. Further, the indicia presents the advantage that nothing must be changed when a helix which serves as a holder for the medical items is replaced with a different sized helix, which may need to be done for purposes of reconfiguring the system. In a preferred embodiment of the invention the indicia corresponding to different sized helixes may be presented in contrasting colors to make more apparent the number of items remaining to be dispensed.

Figure 12:
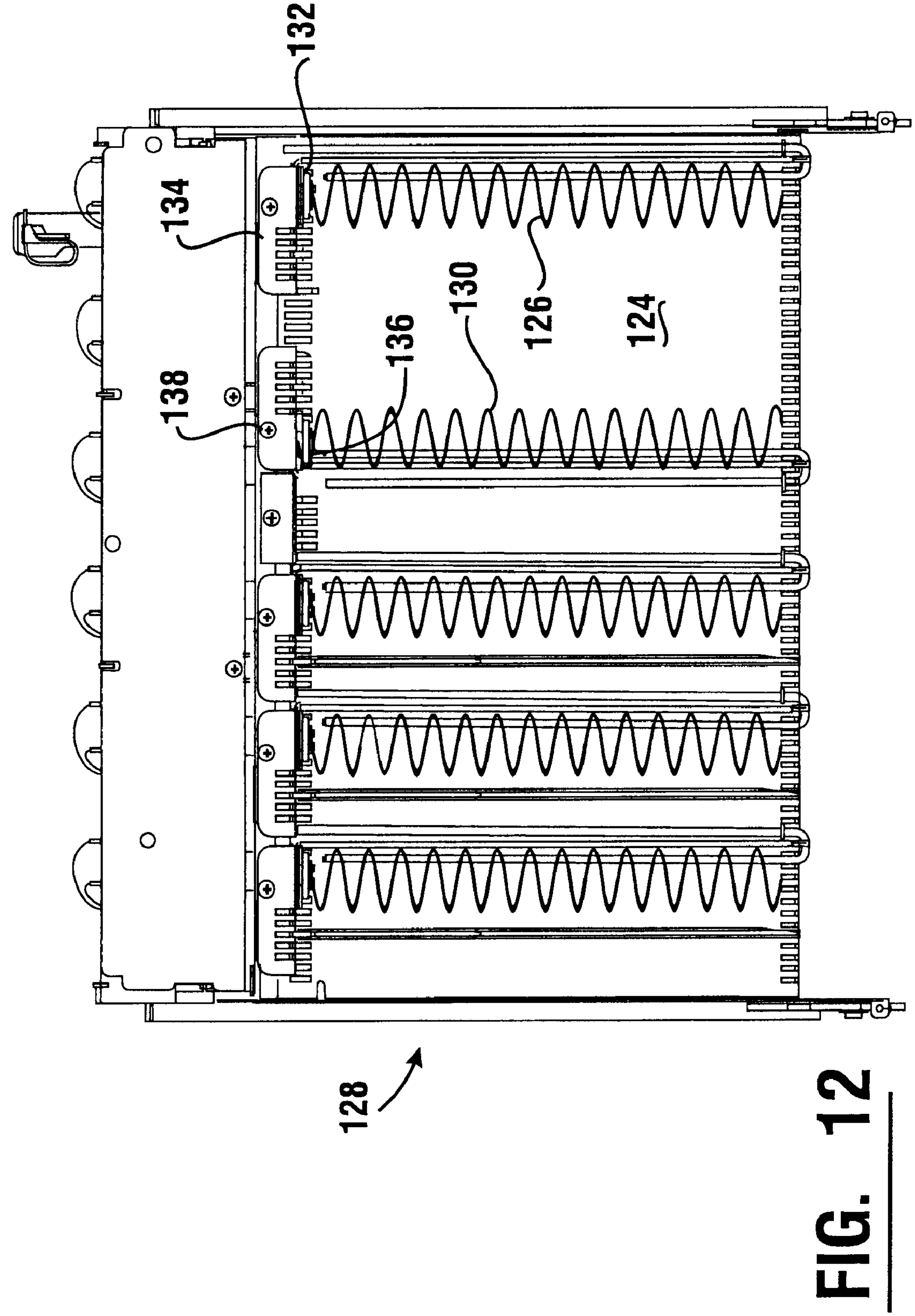
FIG. 12 is a top plan view of a dispenser module similar to that shown in FIG. 5 configured for dispensing larger medical items.

As previously discussed, the preferred embodiment of dispenser module 28 may be configured in numerous ways to accommodate different sizes and types of medical items. An alternatively configured dispenser module generally indicated 128 is shown in FIG. 12. Dispenser module 128 is identical to dispenser module 28 except in the specific details noted. Dispenser module 128 includes a holder generally indicated 124 for relatively large sized medical items. Holder 124 includes a first helix 126 disposed to the right as shown in FIG. 10 and a second helix 130 disposed to the left as shown in FIG. 12. Helix 126 is turned by a dispenser mechanism which includes a spool 132 supported on a first support bracket 134. Helix 130 is turned by a spool 136 of the dispenser mechanism which is supported on a support bracket 138. It should be noted that support brackets 134 and 138 are mirror images of one another.

Spools 132 and 136 are each driven by a rotating mechanism in increments of one turn in a manner previously discussed. However the rotating mechanisms are configured to rotate in opposite directions. Medical items which extend across holder 124 and engage each of helixes 126 and 130 are moved uniformly in an outward direction until they disengage the free ends of the helixes and fall into path 54 of the dispenser.

Dispenser module 128 is configured to hold larger sized medical items than those which are held in the three other holders and associated helixes thereon. For example, holder 124 may be used to hold and dispense cards with a plurality of capsules and pills. Alternatively, holder 124 may be used to dispense medical items such as syringes or medical appliances.

It is a fundamental advantage of the preferred embodiment of the present invention that the dispenser modules may be configured for holding and dispensing medical items of various sizes, including those items which extend a substantial width. The only limiting factor for purposes of dispensing items is the width of items that are enabled to pass through the throat area 62 of the path 54 and into the pocket 56. Of course, in modified versions of the invention which are specifically adapted for dispensing large items the dispenser module of the type shown in FIG. 12 can be used for dispensing very large items such as catheters and suction tubes which extend the full width of the dispenser module.

Figure 24:
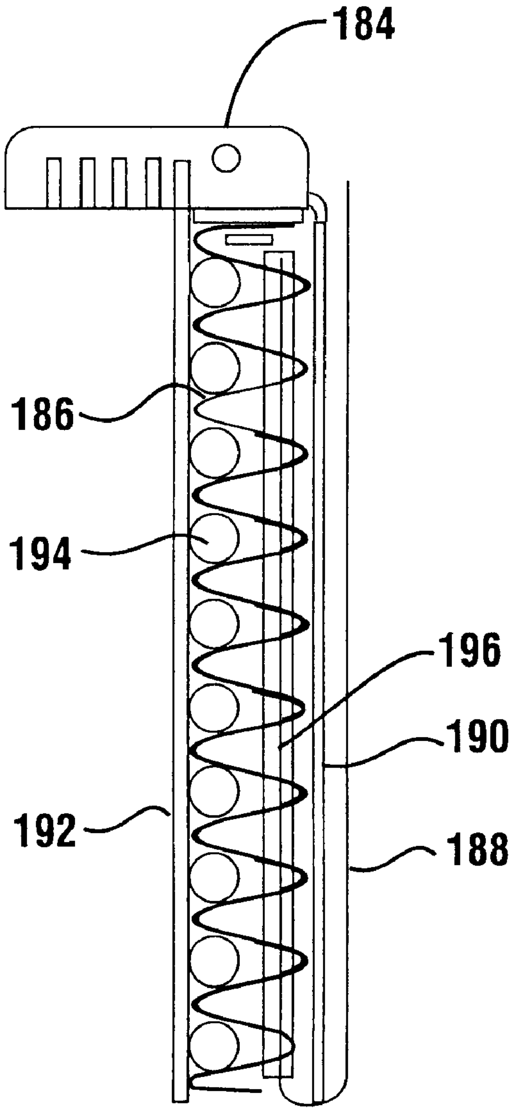
FIG. 24 is a top plan view of a portion of a dispenser module of the type shown in FIG. 5 configured to dispense medical items which are in the form of small cylindrical containers.
Figure 25:
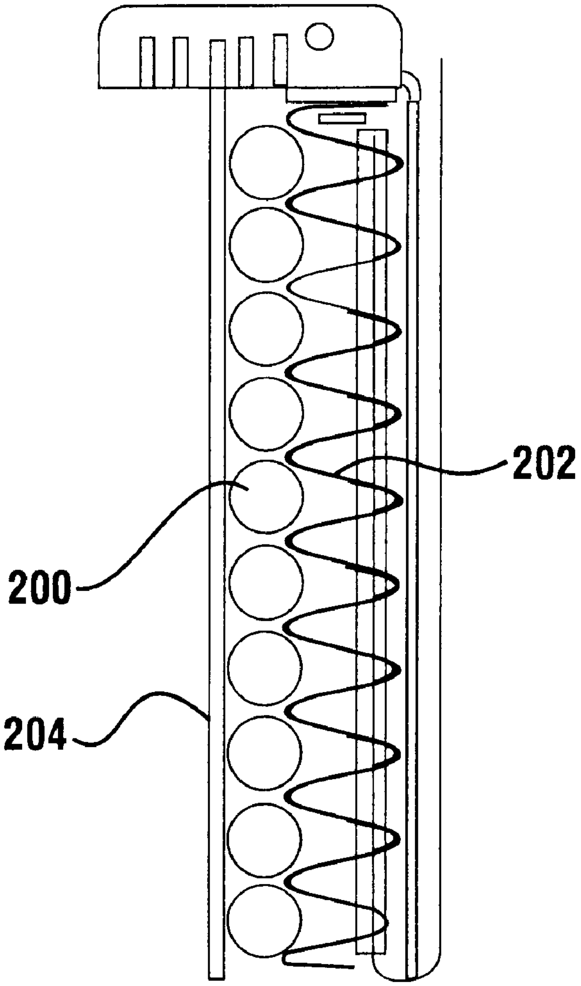
FIG. 25 is a top plan view of a portion of a dispenser module similar to that shown in FIG. 5 configured to dispense cylindrical containers of a larger size than those in FIG. 24.
Figure 26:
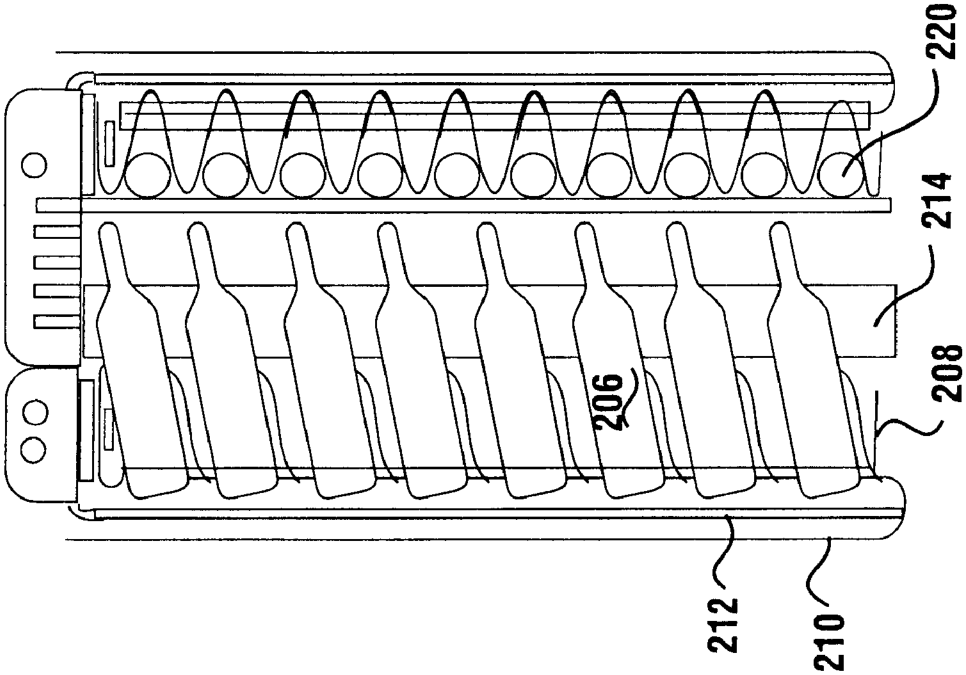
FIG. 26 is a top plan view of a portion of a dispenser module similar to that shown in FIG. 5 configured to dispense ampules and cylindrical containers.

Alternative configurations for portions of dispenser modules are shown in FIGS. 24–26. It should be understood that these are alternative configurations for portions of dispenser modules which are otherwise similar to dispenser modules 28 and 128.

FIG. 24 shows a support bracket 184 similar to support bracket 112 which is attached to a dispenser module. A motor (not shown) is operative to rotate a helix 186. A holder guide 188 similar to holder guide 86 extends in the interior of the helix 186 and is supported on a guide wall 190 in the manner previously described.

A guide 192 is positioned adjacent to helix 186. Guide 192 is similar to guides 104. Guide 192 is positioned to engage medical items 194. Medical items 194 are generally cylindrical items such as vials, ampules or other similar types of containers.

Figure 28:
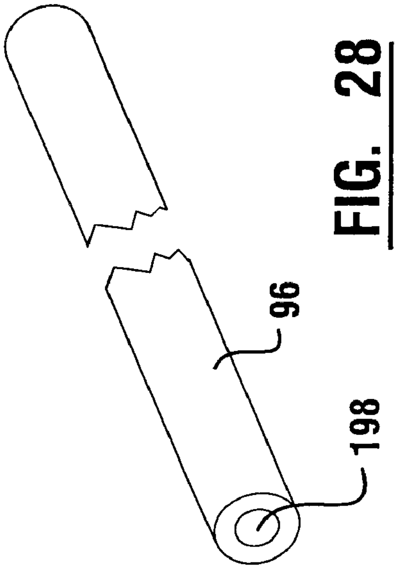
FIG. 28 is a front isometric view of a medication limiter of the type shown in FIGS. 24–26.

A limiting member 196 is positioned on holder guide 188 in the area inside the helix 186. Limiting member 196 which is shown in more detail in FIG. 28, includes an opening 198 therethrough. Opening 198 is sized to accept the holder guide in relatively close fitting relation.

The limiting member 198 functions to occupy a sufficient area within the interior of the helix so that the medical item 194 positioned at the front of the helix cannot fall through the central opening of the helix. This ensures that a medical item will be dispensed only upon the proper rotation of helix 186. The limiting member 196 is particularly useful when the items being dispensed are relatively small compared to the inside diameter of the helix. The limiting member 196 may be readily removed to reconfigure the dispensing module to handle other types of medical items for which the limiting member is not required.

FIG. 25 shows a configuration for a portion of a dispensing module similar to that shown in FIG. 24 which is used for dispensing larger medical items 200. In the configuration shown in FIG. 25 a helix 202 having a pitch suited to the size of items 200 is used. A guide 204 is also positioned to accommodate the size of the larger medical items.

An alternative configuration for a portion of a dispensing module is shown in FIG. 26. In this configuration medical items 206 are dispensed. Medical items 206 are shown as relatively large ampules, but this is but one of several types of medical items that may be dispensed using this alternative configuration. Items 206 are positioned in a suitably sized helix 208. A holder guide 210 extends adjacent to the helix 208. Holder guide 210 is similar to holder guides previously described. The holder guide 210 may extend through the interior of the helix. As shown in FIG. 26, the holder guide may also serve to position and hold the medical items 206 below the holder guide in the helix.

Figure 27:
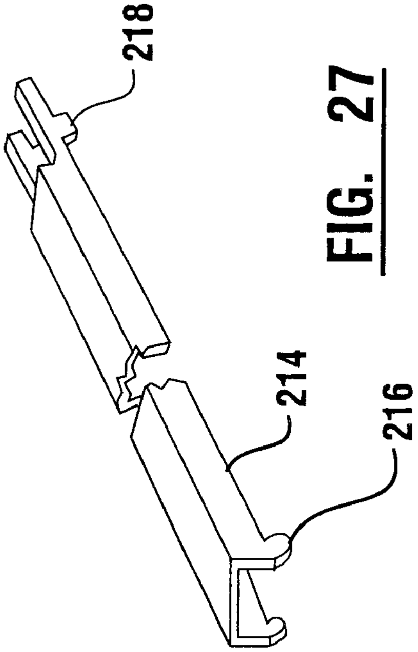
FIG. 27 is a front isometric view of a helix guide of the type shown in FIG. 26.

A wall 212 is positioned adjacent to the helix 208 and supports the holder guide 210 in a manner similar to that previously described. A helix guide 214 is positioned adjacent to helix 208 on a side opposite wall 212. The helix guide 214 which is shown in greater detail in FIG. 27 is used in lieu of a guide wall. The helix guide 214 includes a pair of hook portions 216 and a pair of back tabs 218 which enable the helix guide to be selectively positioned in the first and second slots of the supporting surface of the dispenser module.

The helix guide provides support for helix 208 to hold it in proper position. It also operates to maintain the medical items 206 in a desirable position with one end disposed upward from the supporting surface. Positioning the medical items in this manner increases dispensing reliability. As also indicated in FIG. 26, the dispenser configuration used with elongated items 206 can be included in a dispensing module with a configuration similar to those shown in FIGS. 24 and 25 for dispensing items 220.

Figure 14:
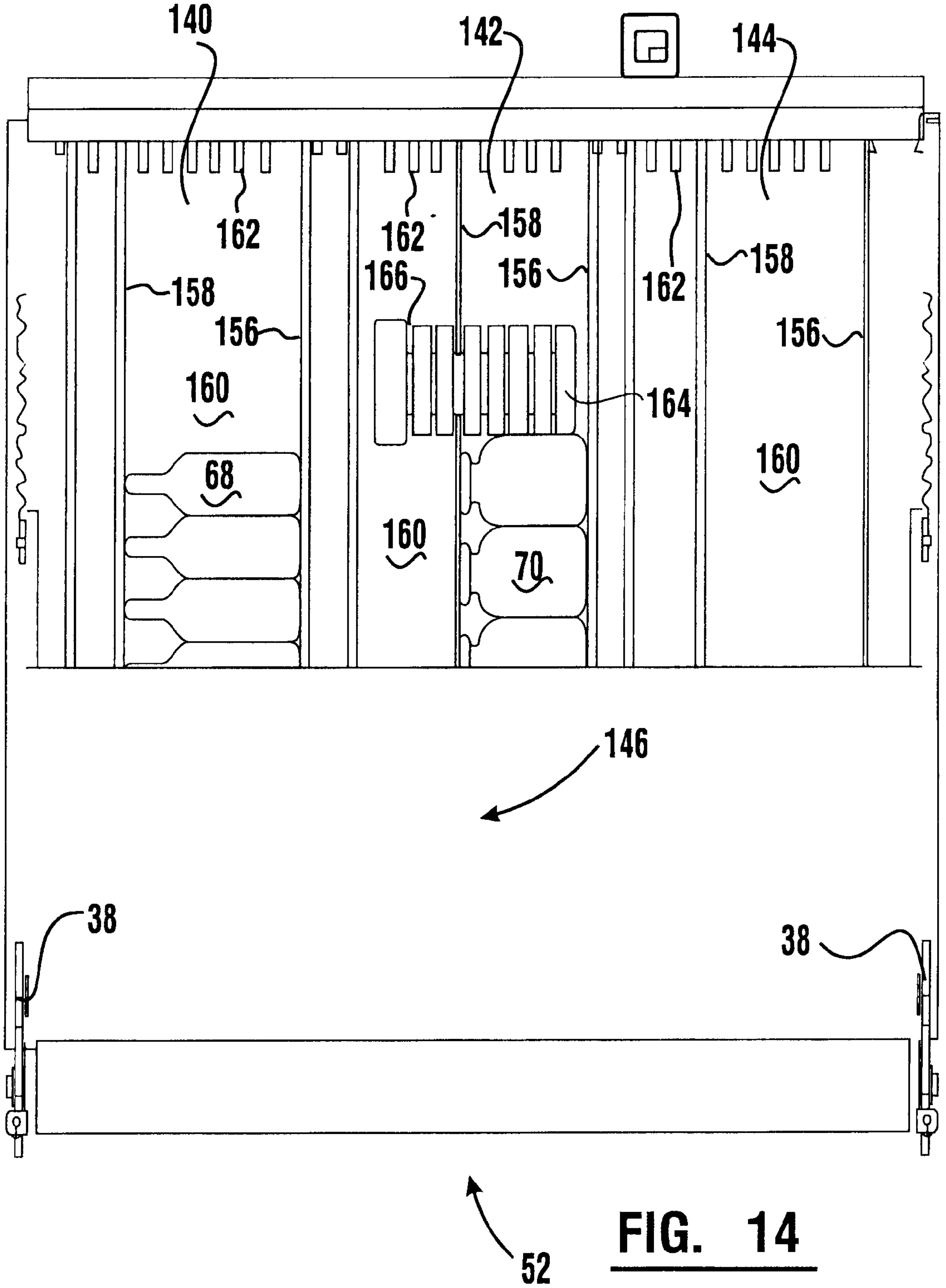
FIG. 14 is a top plan view of a second type of dispenser module used for dispensing medical items which include liquid medications.
Figure 15:
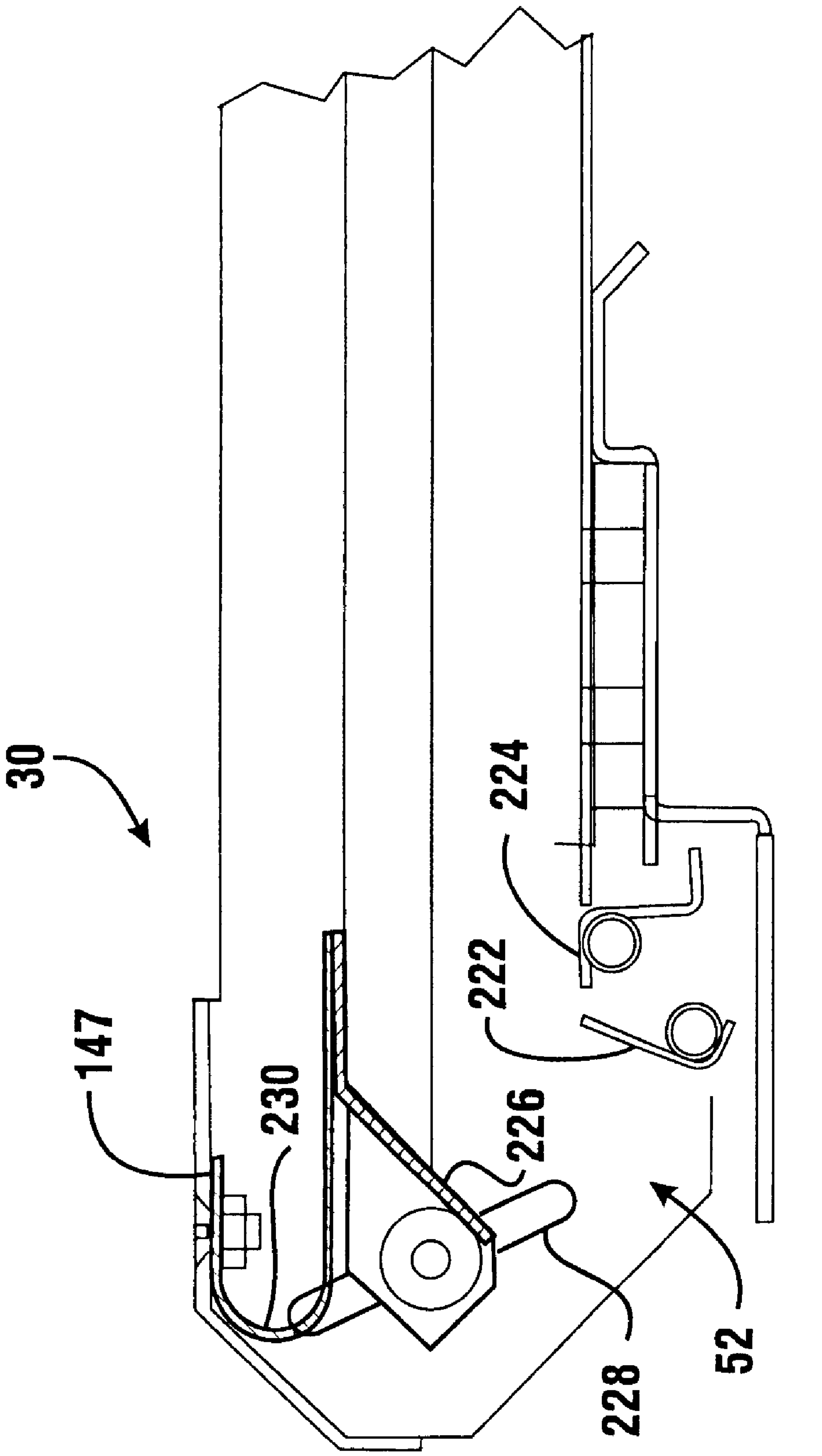
FIG. 15 is a side cross sectional view of the front portion of the dispenser module shown in FIG. 14 with the medications not shown.

Dispenser module 30 is shown in greater detail in FIG. 14. Dispenser module 30 includes a plurality of holders which hold generally cylindrical containers having a circular cross section. These cylindrical containers may include ampules 68 and vials 70. Of course, other types of medical items including cartridges may be housed and dispensed. In FIG. 14 ampules 68 are held in a holder 140 and vials 70 are held in a holder 142. Module 30 includes a third holder 144, however the medical items held therein are obscured by a movable cover 146. It should be understood that each of the holders 140, 142 and 144 have a mechanism associated therewith as described in co-pending U.S. patent application Ser. No. 08/361,783, the disclosure of which is incorporated herein by reference. As shown in FIG. 15, the dispensing mechanism includes a movable front gate member 222 and a back gate member 224. These gate members move in coordinated relation to dispense the medical items from the holder one at a time in a controlled fashion in response to electrical signals. Dispensed medications pass from the dispense location 52 at the front of each holder in the dispenser module 30, and into the path 54 in the dispenser when the dispenser module is in the operative position.

As shown in FIG. 15, a guide 226 is selectively positionable in guide slots 228 so the dispenser may dispense items of various diameters. A thin flexible limiting member 230 extends between the guide 226 and a top plate 147. Member 130 prevents medical items from being dislodged and passing out of the holder through the area between guide 226 and top plate 147.

As best shown in FIG. 4, cover 146 is slidably and pivotally mounted about pivots 148. Cover 148 further includes downward depending locking tabs 150 which engage locking pins 152.

As shown in FIGS. 4 and 14, in the downward position of cover 146, the cover extends above and across the holders on dispenser module 30. Cover 146 is enabled to be moved to an up position by rotating it in a clockwise direction about pivots 148. This can only be accomplished by moving the cover 146 forward against the biasing force of a spring 154 so that locking tabs 150 disengage from the pins 152. This can be readily accomplished when dispenser module 30 is in the extended position out of the opening 18 of the dispenser and/or is disconnected from the dispenser as shown in FIG. 4.

When dispenser module 30 is positioned within the interior area 14 of enclosure 12 as shown in FIG. 2, the cover 146 cannot be moved to an up position. This is because movement of the cover is prevented by either an adjacent dispenser module when the dispenser module 30 is in other than the uppermost position in the dispenser. When the dispenser module 30 is in the uppermost position as shown in FIG. 2, movement of the cover 146 to the up position is prevented by engagement with the components of enclosure 12 and the lock 22. This configuration makes it difficult for an unauthorized person attempting to gain access to the medical items housed in the dispenser module to do so by extending a tool through the path 54. This further increases the security of the preferred embodiment of the invention.

Figure 19:
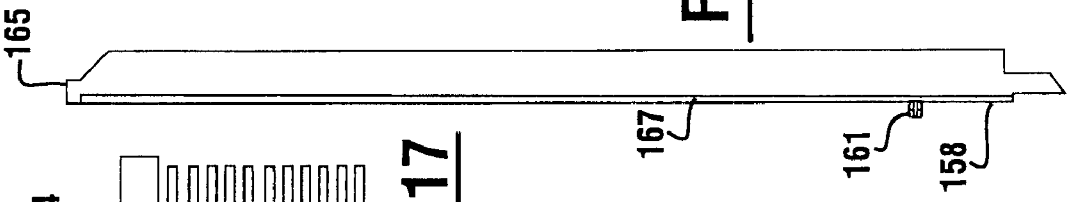
FIG. 19 is a side view of a guide used in connection with the dispenser shown in FIGS. 14–16.

As shown in FIG. 14, medications in the holders are guided to move in a stack downwardly towards the dispensing mechanism, which is not shown because it is positioned under the cover 146 in FIG. 14. The stack is guided to move downwardly by the biasing force of gravity guided by walls 156 which bound the sides of the enclosures. The medical items are further guided by movably positionable guides 158. A guide is shown in detail in FIG. 19. Guides 158 extend upwardly from a supporting surface 160 which extends across the bottom of each holder and supports the stack of medical items thereon.

Figure 16:
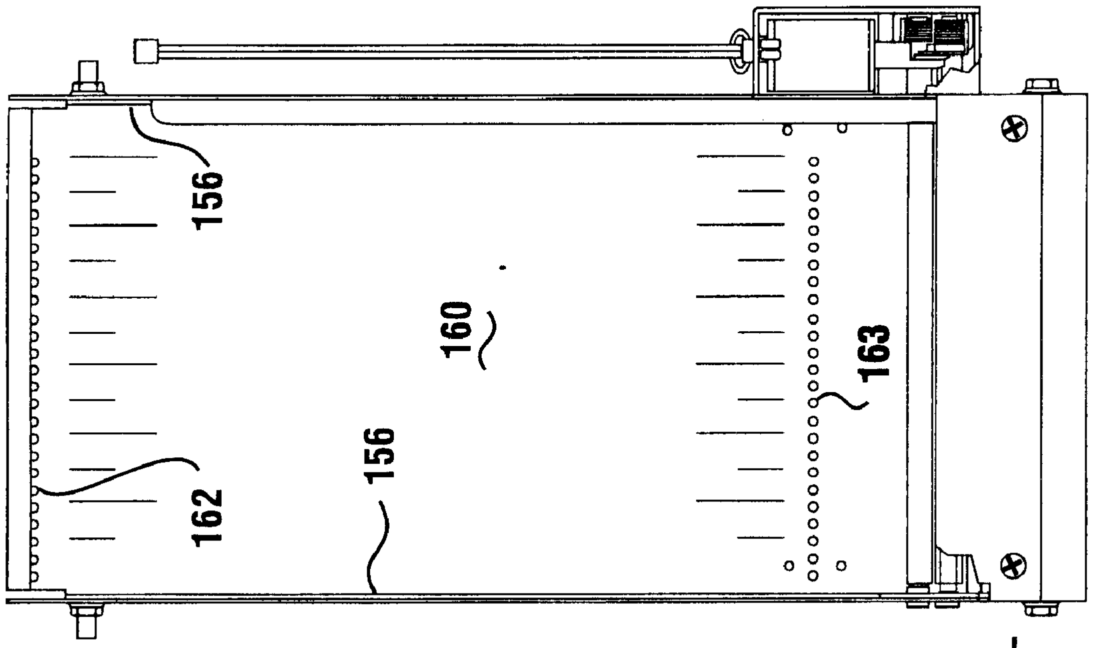
FIG. 16 is a top plan view of the dispenser shown in FIG. 14 with the medications and dividers removed.

As best shown in FIG. 16 which shows a holder in dispenser module 30 without the cover, the supporting surface includes a plurality of slots 162 and apertures 163. Guides 158 include tabs 165 which are selectively positionable in such slots 162 and projections 161 which are selectively positionable in apertures 163. This enables positioning the guide 158 a desired transverse distance from an adjacent wall 156.

A follower 164 is used in connection with a stack of vials 70 to assure that the vials move downwardly as they are dispensed. The follower 164 is a generally cylindrical weighted member that is rotatably movable in engaged relation with the medical items in the stack.

Figure 17:
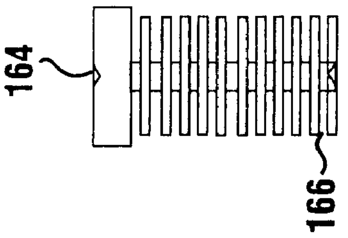
FIG. 17 is a front plan view of a first follower used in connection with the dispenser module shown in FIGS. 14–16.

As best shown in FIG. 17, follower 164 includes a plurality of axially spaced annular grooves 166. Annular grooves 166 are sized for accepting guide 158 therein. Follower 164 is of sufficient diameter and weight, and grooves 166 are configured, so that the force of gravity will cause the follower 164 to overcome any resistance to movement that may be caused by the engagement of guide 158 in a groove. This enables the follower to move downwardly and to apply a downward force to the medical items in the stack. This helps to assure their proper dispense. It should be noted that follower 164 has a slightly greater diameter on an end disposed from the grooves 166. This enables the axis of the follower to remain parallel to the supporting surface while in engagement with a lip 167 on the guide 158.

As will be appreciated with reference to FIG. 14, annular grooves 166 in follower 164 are spaced in a manner that corresponds to the spacing of slots 162 and apertures 163. This enables the follower to be used with various sizes of medical items regardless of where the guide 158 may be positioned. The follower 164 has been found to be particularly advantageous when small or lightweight medical items are to be dispensed and it is desirable to provide additional biasing force on the stack to be sure that the medical items do not become caught on guides 158 or walls 156 in a manner which will prevent their proper dispense.

Figure 18:
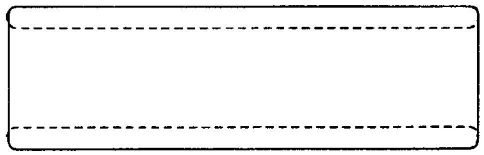
FIG. 18 is a front plan view of a second follower used in connection with the dispenser module shown in FIGS. 14–16.
Figure 20:
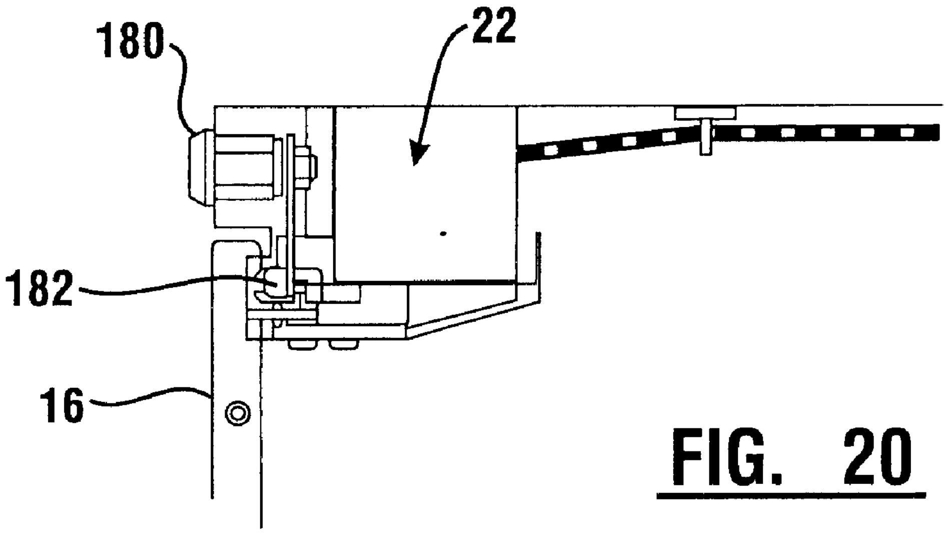
FIG. 20 is a partial side view of the lock used in connection with the door of the dispenser mechanism.

An alternative follower 232 is shown in FIG. 18. Follower 232 is about the full width of the interior of a holder between side walls 156. Follower 232 may be used in dispensing relatively long medical items which do not require any guides 158 to be positioned in the holder.

While the preferred embodiment of the present invention includes features which provide greater security against access to the medical items stored therein by unauthorized personnel, it is important that authorized personnel have ready access to the interior area 14 of enclosure 12 for purposes of replenishing medical items, taking inventory or repairing dispenser modules. The preferred embodiment of the present invention includes the lock 22 which selectively enables or prevents the opening of door 16.

Figure 21:
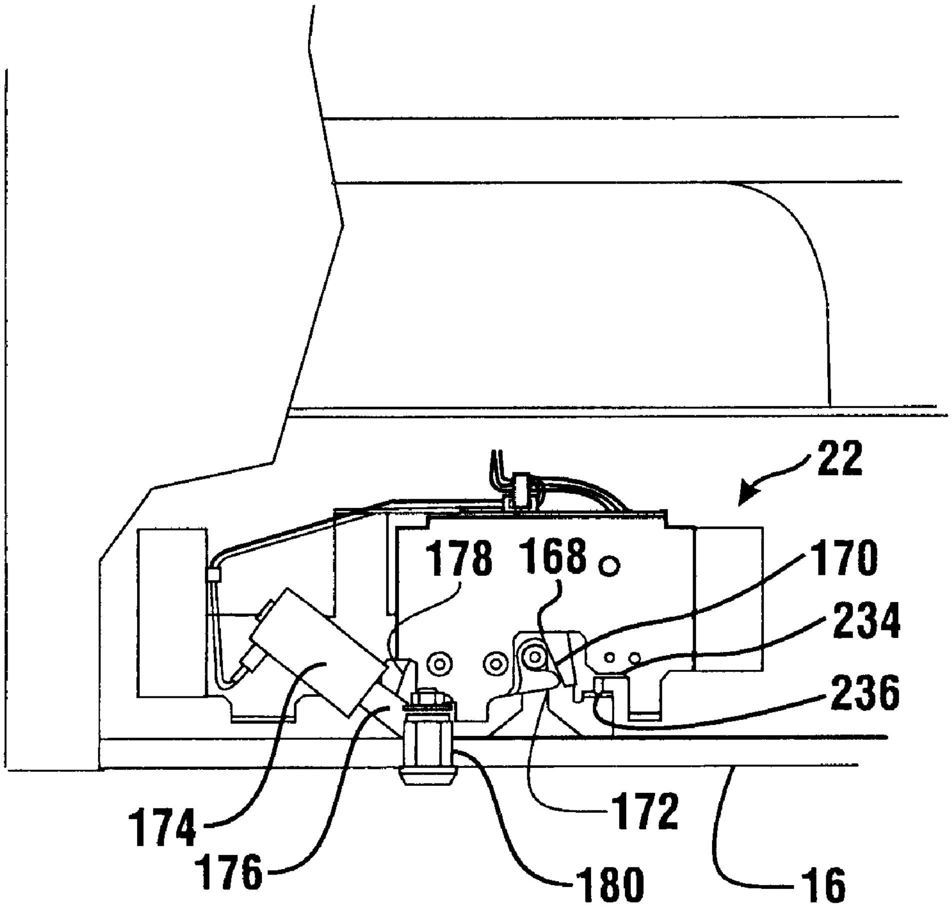
FIG. 21 is a top view of the lock shown in FIG. 20.
Figure 22:
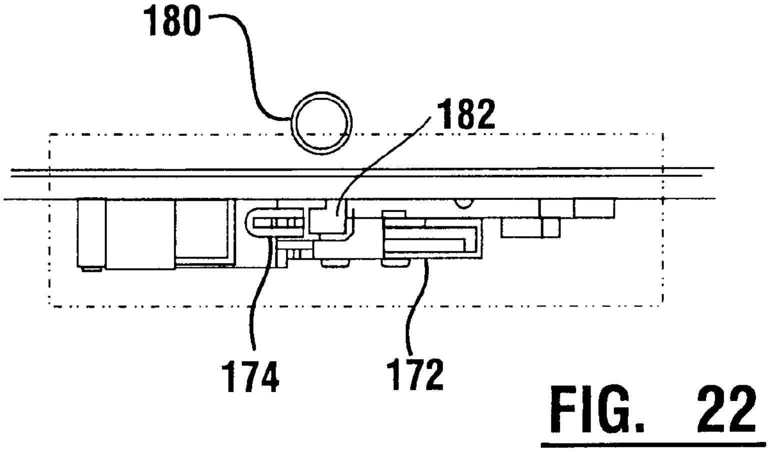
FIG. 22 is a front transparent view of the lock shown in FIG. 20 and the door of the enclosure.
Figure 23:
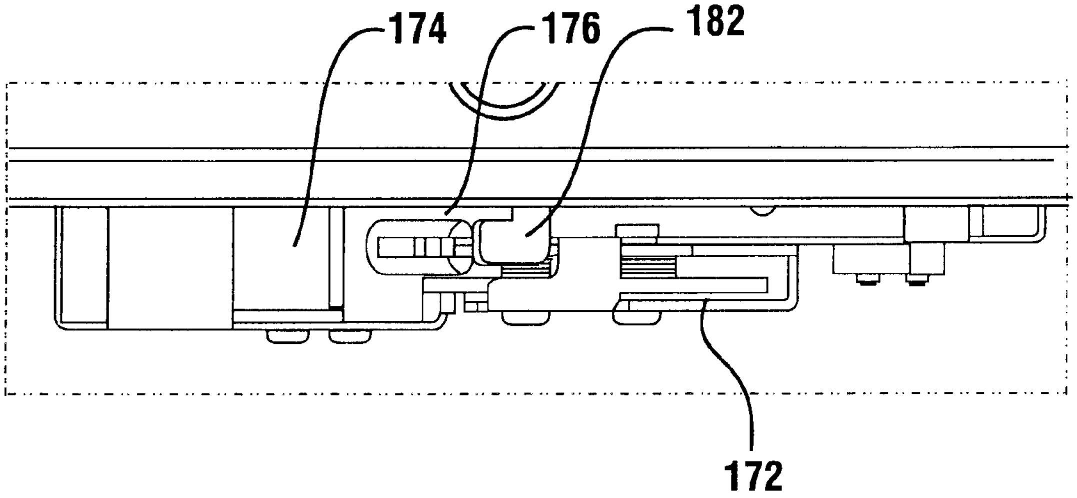
FIG. 23 is an enlarged view of the lock shown in FIG. 22.

As best shown with reference to FIG. 21, door 16 has an attached connection therewith a locking post indicated 168. Locking post 168 is sized for engagement in a slot 170 which extends in the body of lock 22. A movable locking pawl 172 is mounted adjacent to slot 170.

When door 16 is moved from the open to the closed position, locking post 168 moves into slot 170. As locking post 168 moves into the slot it engages the locking pawl 172 and moves it to a position shown in FIG. 21 where a portion of the pawl blocks the escape of the locking post from the slot 170. Upon reaching the locking position, the pawl 172 is held by a spring-loaded detent or similar conventional mechanism.

A fundamental advantage of the preferred embodiment of the present invention is that lock 22 once in a locked condition, may be moved to an unlocked condition by two independent unlocking mechanisms. This is advantageous because an authorized user is enabled to open door 16 using one of two secure methods. The first unlocking mechanism includes an electrically actuated solenoid 174. In response to an electrical signal, solenoid 174 is operative to move an actuator 176 of the solenoid in an inward direction relative to the solenoid, as shown in FIG. 21. Actuator 176 rotates a member 178 which is operative to release pawl 172. The release of pawl 172 enables locking post 168 to move out of slot 170 and door 16 to be opened.

Lock 22 further includes a second unlocking mechanism which includes a mechanism that is operative to unlock the lock in response to manual manipulation. The second unlocking mechanism includes a lock cylinder 180, which has a member 182 in connection therewith. Member 182 is enabled to be rotated by insertion of a proper key (not shown) into lock cylinder 180. Upon rotation of the key in the lock cylinder, member 182 engages actuator 176 and moves it in a manner similar to that achieved by solenoid 174. This enables unlocking lock 22 with a key.

In the system of the preferred embodiment, an authorized user who is entitled to have access to the interior area of dispenser 10 inputs data into a display terminal which identifies the user as authorized to open the dispenser. The user then inputs appropriate commands. In response to the input of the proper commands, the display terminal outputs electrical signals which are eventually transmitted to solenoid 174, which changes lock 22 from a locked to an unlocked condition. This is generally the manner in which an authorized user will gain access to the interior area of the dispenser.

In the event of a malfunction which renders the display terminal inoperative or otherwise prevents the actuation of solenoid 174, an authorized user is provided with a key for lock cylinder 180. The insertion of the key enables opening the door 16 to accomplish the desired activity. Of course, in other embodiments enhanced security may be provided by including two different key locks and an appropriate mechanism for tying together the key locks so that both must be turned by different keys in order to open the door 16. It should also be understood that while the preferred method of manual manipulation used for unlocking the lock 22 is a key, in other embodiments other manually manipulatable locking mechanisms may be used. These may include for example, combination locks.

A sensing switch indicated 234 is positioned in the interior of the dispenser. When the door 16 is closed the switch is in contact with a strike 236. When the door opens the strike no longer contacts the switch. The switch 234 is operative to indicate to the display terminal and the rest of the system whether the door is open or closed. The switch may be used to verify whether valid or invalid access has been gained to the dispenser.

If electronic access to the dispenser has been granted, the switch 234 verifies that the door 16 is opened. Likewise, it verifies that the door is closed when a user authorized to have access to the dispenser indicates to the display terminal they have completed their activity inside the dispenser. If key access is attained, a signal is generated by switch 234 which is received at the display terminal. The programming of the system preferably requires verification either immediately or subsequently that such key access is authorized.

Switch 234 also provides a signal which can be used to provide an indication that the dispenser has been accessed. This can be done with the system which includes the display terminal to indicate at devices or terminals connected to the system that the dispenser has been opened. Alternatively or in addition, switch 234 can be connected to a totally separate security system which monitors access to the dispensers in the system.

As will be appreciated from the foregoing description the preferred embodiment of the dispenser of the present invention provides flexibility in terms of reliably dispensing a wide variety of sizes and types of medical items. The dispenser is constructed to provide enhanced security against access to the medical items stored therein by unauthorized persons. However authorized persons are readily enabled to gain access to the dispenser.

Thus, the new dispensing apparatus for medical items achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means capable of performing the recited function and shall not be deemed to be limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. A method comprising:

(a) positioning a rotatable helix of a first size adjacent a reference surface within an enclosure of a medical item dispenser, wherein the helix includes a longitudinal axis, wherein the reference surface has rows of human readable indicia thereon, wherein the rows are spaced in aligned side by side relation, wherein the rows extend in a direction substantially parallel to the longitudinal axis, wherein the enclosure is operative to respectively support different sized helixes positioned adjacent the reference surface, wherein each indicia row respectively corresponds to a different sized helix;

(b) positioning a plurality of medical items in supporting connection with the reference surface, wherein each medical item is positioned between turns of the helix;

(c) dispensing at least one medical item from the medical item dispenser through rotation of the helix, wherein indicia in a first row is operative to indicate a quantity of medical items in the helix, wherein indicia in a second row is operative to indicate a quantity of medical items in a helix of a second size, wherein the first size differs from the second size;

(d) determining a quantity of medical items remaining positioned in the helix by viewing first row indicia;

(e) removing the helix from adjacent the reference surface;

(f) positioning a rotatable helix of a second size adjacent the reference surface;

(g) positioning a plurality of medical items in supporting connection with the reference surface, wherein each medical item is positioned between turns of the helix of a second size;

(h) dispensing at least one medical item from the medical item dispenser through rotation of the helix of a second size;

(i) determining a quantity of medical items remaining positioned in the helix of a second size by viewing second row indicia.

2. The method according to claim 1 wherein (d) includes viewing first row indicia through turns of the helix.

3. The method according to claim 1 wherein the reference surface has three rows of human readable indicia thereon.

4. A method comprising:

(a) positioning a rotatable helix of a first size adjacent a reference surface within an enclosure of a medical item dispenser, wherein the helix includes a longitudinal axis, wherein the reference surface has rows of human readable indicia thereon, wherein the reference surface has indicia thereon in contrasting colors, wherein the rows are spaced in aligned side by side relation, wherein the rows extend in a direction substantially parallel to the longitudinal axis, wherein the enclosure is operative to support different sized helixes positioned adjacent the reference surface, wherein each indicia row respectively corresponds to a different sized helix;

(b) positioning a plurality of medical items in supporting connection with the reference surface, wherein each medical item is positioned between turns of the helix;

(c) dispensing at least one medical item from the medical item dispenser through rotation of the helix, wherein indicia in a first row is operative to indicate a quantity of medical items in the helix, wherein indicia in a second row is operative to indicate a quantity of medical items in a helix of a second size, wherein the first size differs from the second size;

(d) determining a quantity of medical items remaining positioned in the helix by viewing first row indicia.

5. The method according to claim 4 wherein first row indicia color differs from second row indicia color.

6. The method according to claim 4 wherein each indicia row includes a plurality of aligned numerals.

7. The method according to claim 4 wherein (b) includes positioning a plurality of medical items having substantially the same size in supporting connection with the reference surface.

8. The method according to claim 7 wherein each indicia row respectively corresponds to a different medical item size.

9. The method according to claim 4 wherein the reference surface has indicia thereon indicative of numbers of medical items in a helix.

* * * * *